(12) United States Patent
Moriya et al.

(10) Patent No.: US 6,473,565 B2
(45) Date of Patent: Oct. 29, 2002

(54) LENS-FITTED PHOTO FILM UNIT HAVING AUXILIARY MODULE

(75) Inventors: Mitsuhiro Moriya; Kazuhito Iwase, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/788,567

(22) Filed: Feb. 21, 2001

(65) Prior Publication Data

US 2001/0017980 A1 Aug. 30, 2001

(30) Foreign Application Priority Data

Feb. 25, 2000 (JP) ....................................... 2000-048612
Feb. 25, 2000 (JP) ....................................... 2000-048616
Feb. 28, 2000 (JP) ....................................... 2000-050897
Feb. 28, 2000 (JP) ....................................... 2000-050898

(51) Int. Cl.⁷ ........................ G03B 17/02; G03B 17/00; G03B 17/24

(52) U.S. Cl. ........................... 396/6; 396/267; 396/311; 396/316

(58) Field of Search ........................... 396/6, 267, 310, 396/315, 316, 471

(56) References Cited

U.S. PATENT DOCUMENTS 5,634,163 A  5/1997  Kamata ..................... 396/458
5,978,608 A  11/1999 Tasaka et al. ............... 396/315
6,243,536 B1 * 5/2001  Moriya et al. ................. 396/6

* cited by examiner

Primary Examiner—David M. Gray
Assistant Examiner—Rochelle Blackman
(74) Attorney, Agent, or Firm—Young & Thompson

(57) ABSTRACT

A lens-fitted photo film unit has a main body preloaded with photo film. A front cover covers a front of the main body. An exposure unit is secured between the main body and the front cover, for providing the photo film with an exposure. A plate-shaped information imprinting module is secured between the main body and the front cover with the exposure unit. Positioning pins are formed in the front of the main body. Positioning holes are formed in a rear of the information imprinting module, and are fitted on the positioning pins. The information imprinting module is subsequently kept positioned between the front cover and the main body by fitting the front cover on the main body.

26 Claims, 13 Drawing Sheets

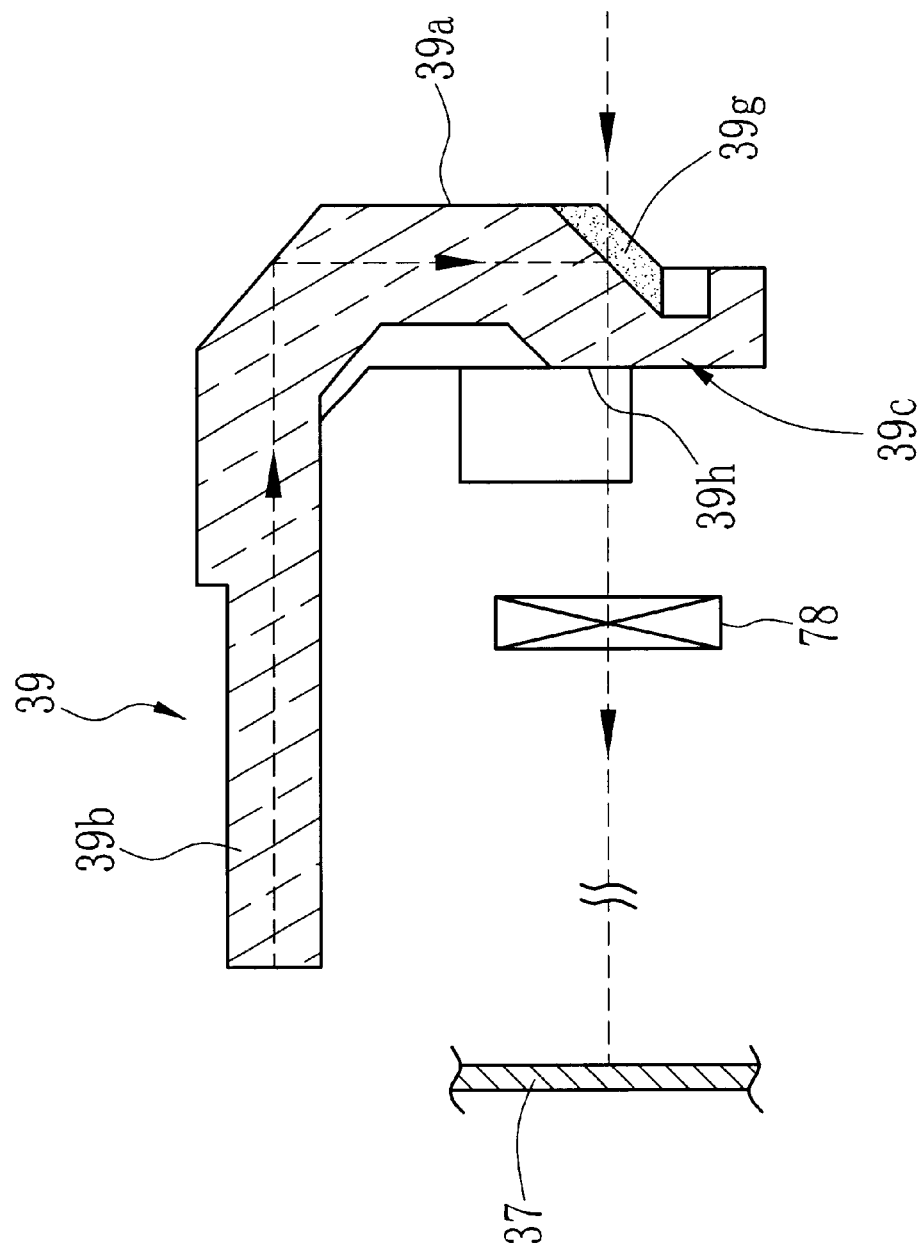

LENS-FITTED PHOTO FILM UNIT HAVING AUXILIARY MODULE

BACKGROUND OF THE INVENTION

1. Field of the Invention

The present invention relates to a lens-fitted photo film unit having an auxiliary module. More particularly, the present invention relates to a lens-fitted photo film unit which includes an auxiliary module for imprinting information to photo film and in which the auxiliary module can operate with reliability.

2. Description Related to the Prior Art

A lens-fitted photo film unit is known in the art, and pre-loaded with unexposed photo film. The lens-fitted photo film unit includes a housing, which is constituted by a main body for containing a photo film cassette, a front cover for covering a front of the main body, and a rear cover for covering a rear of the main body. The housing is provided with a sticker with a printed decorative pattern to neaten the appearance as product.

The lens-fitted photo film unit, after taking exposures, is forwarded to a photo laboratory without removal, and subjected to operation of development and printing. The lens-fitted photo film unit after being used is withdrawn by a manufacturer and recycled. In the recycling step, the housing is disassembled into parts of various kinds. Plastic parts such as front and rear covers are pelletized and melted and reused as raw material. A flash unit and the like are subjected to inspection of performance, and reused if there is no problem.

There are types of lens-fitted photo film units having an auxiliary device for operation additional to taking an exposure. Examples of auxiliary devices are an electronic flash device, an aperture stop changer mechanism, and an information imprinting device, which optically imprints information to the photo film, information such as a numerical date of an exposure.

U.S. Pat. No. 5,978,608 (corresponding to JP-A 10-096991) discloses an example of the information imprinting device, which includes a date imprinting module and an imprinting shutter member. The date imprinting module includes a timekeeper circuit and a liquid crystal display (LCD) panel. The timekeeper circuit has information of a calendar previously written thereto. The LCD panel displays a date of an exposure. The imprinting shutter member is operable in response to a photographing shutter blade. The LCD panel indicates the date in such a manner that a background of the numerals is dark and the numerals are conspicuously bright or transparent. The date imprinting module is disposed between the main body and front cover. A light guide member is disposed on a front face of the front cover for introducing natural light into the LCD panel. The imprinting shutter member is opened and closed to cause information light from the LCD panel to become incident upon an exposure region in the photo film.

The date imprinting module is a relatively expensive product. If the date imprinting module is removed from the lens-fitted photo film unit and reused, a total cost of manufacturing the lens-fitted photo film unit may be decreased.

The light guide member receives natural light and utilizes as the information light. Furthermore, there are other ideas as light source for imprinting. For example, light-emitting diodes (LED) are used. Also, the light guide member protrudes from the front cover toward the main body, and is provided with a flash light entrance face at the protruding portion, to utilize part of flash light leaked in the housing. Those ideas are for the purpose of obtaining a sufficient amount of the information light even when brightness of a photographic field is low, for example at night.

However, the information imprinting device according to the prior art has a problem of errors in operation, because the imprinting shutter member may be shifted by shock or vibration to the lens-fitted photo film unit and a light path for imprinting information may be opened.

If LEDs as light source are used for imprinting, the manufacturing cost will increase, because of additional structures of the LEDs and a circuit for driving the LEDs. If the structure with the light guide member protruding from the front cover to the main body is used, it is likely that the information light may be too weak and insufficient for a proper exposure typically when brightness of a photographic field is extremely low.

It is conceivable that retaining hooks are used to keep the date imprinting module positioned reliably without shock or vibration. However, the LCD panel must be disposed close to a taking lens for the purpose of recording the information light into the exposure region. The date imprinting module lies in a very small space between the front cover and an exposure unit having the taking lens. Disposition of retaining hooks or the like causes the front cover to have protruding portions. This makes the housing to have a considerably great thickness in the back-to-front direction.

SUMMARY OF THE INVENTION

In view of the foregoing problems, an object of the present invention is to provide a lens-fitted photo film unit in which erroneous operation of an information imprinting device due to shock or vibration can be prevented.

Another object of the present invention is to provide a lens-fitted photo film unit capable of reliably imprinting information without use of an additional light source.

Still another object of the present invention is to provide a lens-fitted photo film unit having a sufficiently small thickness in a back-to-front direction in a state with an auxiliary device squeezed between a main body and a front cover.

Another object of the present invention is to provide a lens-fitted photo film unit in which a battery for an information imprinting device can be removed readily in disassembling operation.

In order to achieve the above and other objects and advantages of this invention, a lens-fitted photo film unit has a main body pre-loaded with photo film. A front cover covers a front of the main body. An exposure unit is secured between the main body and the front cover, for providing the photo film with an exposure. A plate-shaped auxiliary module is secured between the main body and the front cover with the exposure unit. At least one first positioning portion includes a pin or hole, and is formed in the front of the main body. At least one second positioning portion includes a hole or pin, is formed in a rear of the auxiliary module, and is fitted on the first positioning portion, the auxiliary module being subsequently kept positioned between the front cover and the main body by fitting the front cover on the main body.

In a preferred embodiment, the auxiliary module is an information imprinting module for optically imprinting information to the photo film.

The information is date information. The information imprinting module includes a timekeeper circuit for storing calendar information, and for outputting the date information by periodically renewing the calendar information. A display panel of a transmission type indicates the date information.

The information imprinting module is reset upon discontinuation of being supplied with power.

Furthermore, first and second metal contact segments are connected with the information imprinting module. A battery is connected between the first and second contact segments, for supplying the information imprinting module with power. The front cover has the first contact segment secured thereto, and upon being removed, disconnects the battery from the first contact segment, for discontinuing supply of power for the information imprinting module.

Furthermore, there is formed a photographing opening for being opened/shut by actuation of the exposure unit.

There is formed an imprinting opening behind the display panel.

Furthermore, a shutter release button is formed with the main body in an externally depressible manner. A blocking plate is movable between closed and open positions, for closing the imprinting opening when in the closed position, for opening the imprinting opening when in the open position, and for being shifted to the open position in response to actuation of the shutter release button.

The shutter mechanism has a single shutter blade including a photographing blade portion for opening/shutting the photographing opening. An imprinting blade portion is formed to extend from the photographing blade portion, for opening/shutting the imprinting opening.

The shutter release button is shiftable between an initial position and a depressed position lower than the initial position. The shutter mechanism further comprises a shutter drive lever for opening/shutting the shutter blade when the shutter release button is shifted to the depressed position. Furthermore, a transmission mechanism sets the blocking plate in the closed position when the shutter release button is in the initial position, and sets the blocking plate in the open position in response to a shift of the shutter release button to the depressed position before operation of the shutter drive lever.

The imprinting opening is disposed opposite to the shutter release button with reference to the photographing opening.

The blocking plate extends from a position lower than the photographing opening, and is movable to and away from the photographing opening. The transmission mechanism includes a driving arm formed with the shutter release button to project downwards. A driven arm is formed with the blocking plate to extend between the driving arm and the position lower than the photographing opening, for being pushed by the driving arm upon depression of the shutter release button, to move the blocking plate from the closed position to the open position.

Furthermore, a support pivot supports the driven arm in a rotatable manner.

Furthermore, a bias mechanism biases the blocking plate toward the closed position.

The bias mechanism includes a resilient arm having first and second portions, the first portion being secured to the driven arm. A stopper contacts the second portion, to prevent the second portion from shifting when the blocking plate is shifted toward the open position.

As a result, the lens-fitted photo film unit can have a sufficiently small thickness in a back-to-front direction in a state with the auxiliary module squeezed between the main body and the front cover, because of the first and second positioning portions.

Also, erroneous operation of the information imprinting module due to shock or vibration can be prevented, because the blocking plate closes the imprinting opening when in the closed position.

According to one aspect of the invention, the information imprinting module further includes a light guide member for illuminating the display panel by guiding light thereto.

Furthermore, a flash emitter emits flash light. A flash circuit board controls operation of the flash emitter. The light guide member includes a flash light entrance portion, having at least one portion protruding to a rear of the flash circuit board, for receiving entry of part of the flash light. A light exit portion applies light to a front face of the display panel by guiding the part of the flash light.

The flash light entrance portion has an inclined entrance surface.

The flash light entrance portion extends from the rear of the flash circuit board to a front thereof. The light guide member further includes an arm portion, formed with a front end of the flash light entrance portion, for extending in an L shape with reference to the flash light entrance portion, the arm portion having a rear face for constituting the light exit portion.

The arm portion is an outer light entrance portion for receiving entry of outer light from a photographic field so as to guide the outer light to the light exit portion.

Furthermore, a main body is pre-loaded with the photo film, and provided with the flash circuit board and the information imprinting module. A front cover covers a front of the flash circuit board and the information imprinting module. A light entrance opening is formed in the front cover, for uncovering the outer light entrance portion.

The light exit portion has front and rear faces at least one of which is inclined and has surface roughness.

The light guide member is formed from material including fluorescent dye.

As a result, it is possible reliably to imprint information without use of an additional light source, because the light guide member can introduce light from the flash unit to the display panel.

According to another aspect of the invention, furthermore, a battery supplies the information imprinting module with power. An opening is formed in the front cover and disposed outside the battery. An outer packaging material is secured to an outer face of at least the front cover, for covering at least part of the opening to keep the battery in a predetermined loaded position.

The outer packaging material, upon removal from the front cover, exits the battery through the opening, for discontinuing supply of power for the information imprinting module.

The battery includes first and second electrodes positioned in orientation in respectively inward and outward directions. Furthermore, first and second metal contact segments contact respectively the first and second electrodes, the first contact segment pressing the battery outwards. The outer packaging material causes the second contact segment to push the battery to the first contact segment, compresses the first contact segment resiliently, and upon being removed, allows the first contact segment to push out the battery.

The battery is a button type.

Furthermore, a battery lid is fitted in at least part of the opening. The outer packaging material covers at least part of the battery lid, and upon being removed, exits the battery through the opening, for discontinuing supply of power for the information imprinting module.

Furthermore, first and second metal contact segments contact respectively first and second electrodes of the battery, the first contact segment being away from the first electrode when in a free state. The outer packaging material presses the first contact segment resiliently for keeping the first contact segment in contact with the first electrode, and upon being removed, disconnects the first contact segment from the first electrode, to discontinue supply of power for the information imprinting module.

As a result, the battery for the information imprinting module can be removed readily in disassembling operation.

BRIEF DESCRIPTION OF THE DRAWINGS

The above objects and advantages of the present invention will become more apparent from the following detailed description when read in connection with the accompanying drawings, in which:

FIG. 3A is an explanatory view illustrating the light guide member with the date imprinting module;

DETAILED DESCRIPTION OF THE PREFERRED EMBODIMENT(S) OF THE PRESENT INVENTION

Figure 1:
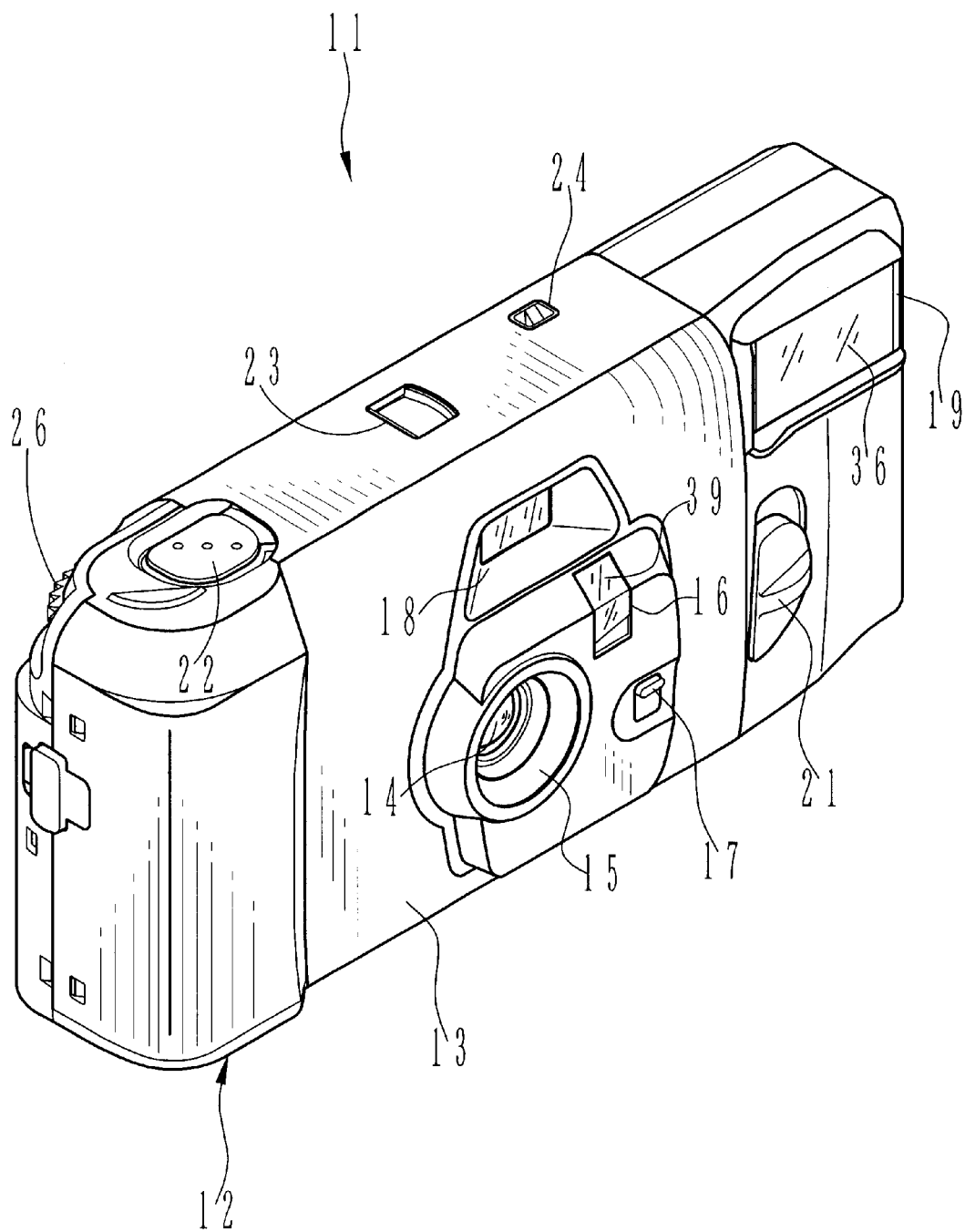
FIG. 1 is a perspective illustrating a lens-fitted photo film unit.

In FIG. 1, a lens-fitted photo film unit 11 is illustrated. The lens-fitted photo film unit 11 has a housing 12 and an outer packaging belt 13 for wrapping a central portion of the housing 12.

A front wall of the housing 12 is provided with a front opening 15, a light entrance opening 16, an imprinting selector button 17, a viewfinder objective window 18, a flash emitter window 19 and a flash charger button 21. A taking lens 14 appears in the front opening 15. An upper wall of the housing 12 is provided with a shutter release button 22, a frame counter window 23 and a charged state indicator window 24. A winder wheel 26 is disposed to protrude to the rear. An information imprinting module is incorporated in the lens-fitted photo film unit 11 to record information to the photo film. The imprinting selector button 17 is an operation member for designating imprinting information or not imprinting any information.

The outer packaging belt 13 consists of a belt-shaped sticker sheet including a sheet and adhesive agent coated with an inner surface of the sheet. The outer packaging belt 13 protects the housing 12 and also operates to neaten the appearance of the lens-fitted photo film unit 11. There are openings formed in the outer packaging belt 13 for uncovering various portions of the housing 12 including the front opening 15 and the viewfinder objective window 18. Also, there is information printed on the outer packaging belt 13 including how to use the lens-fitted photo film unit 11, and notice or warning to users.

Figure 2:
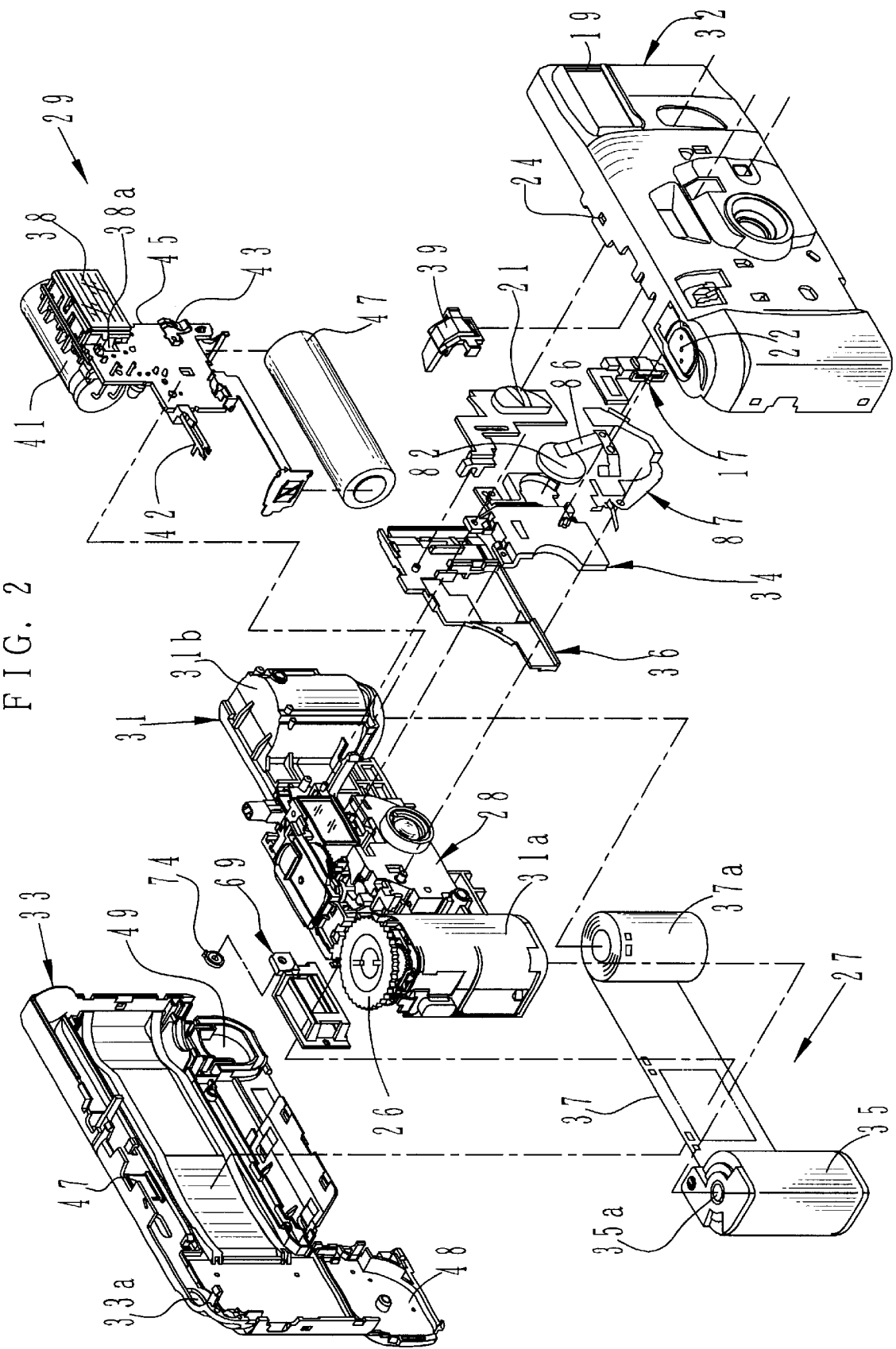
FIG. 2 is an exploded perspective illustrating the lens-fitted photo film unit.

In FIG. 2, the housing 12 is constituted by a main body 31, a front cover 32 and a rear cover 33. The main body 31 is pre-loaded with a photo film cassette 27, and includes an exposure unit 28 and an electronic flash unit 29. The front and rear covers 32 and 33 cover the front and rear of the housing 12. There are an information imprinting module 34 as auxiliary module and a support plate 36 between the main body 31 and the front cover 32. The support plate 36 supports a rear face of the information imprinting module 34.

The main body 31 has a cassette holder chamber 31a and a roll holder chamber 31b. The cassette holder chamber 31a contains a cassette shell 35 of the photo film cassette 27. The roll holder chamber 31b contains a photo film roll 37a formed by winding an unexposed photo film 37 drawn from the cassette shell 35. The exposure unit 28 is disposed on the center of the main body 31 and between the cassette holder chamber 31a and the roll holder chamber 31b. The flash unit 29 is removably secured to the side of the exposure unit 28 by means of engagement of claws.

The upper wall of the front cover 32 includes the shutter release button 22 and the indicator window 24. The front wall of the front cover 32 has the flash emitter window 19. The front cover 32 is secured to the front wall of the main body 31 removably. A flash emitter 38 in the flash unit 29 appears in the flash emitter window 19. A part of a light guide member 39 appears through the light entrance opening 16 externally. The light guide member 39 receives entry of imprinting light for imprinting a date, and guides the light being received into the information imprinting module 34.

Figure 3:
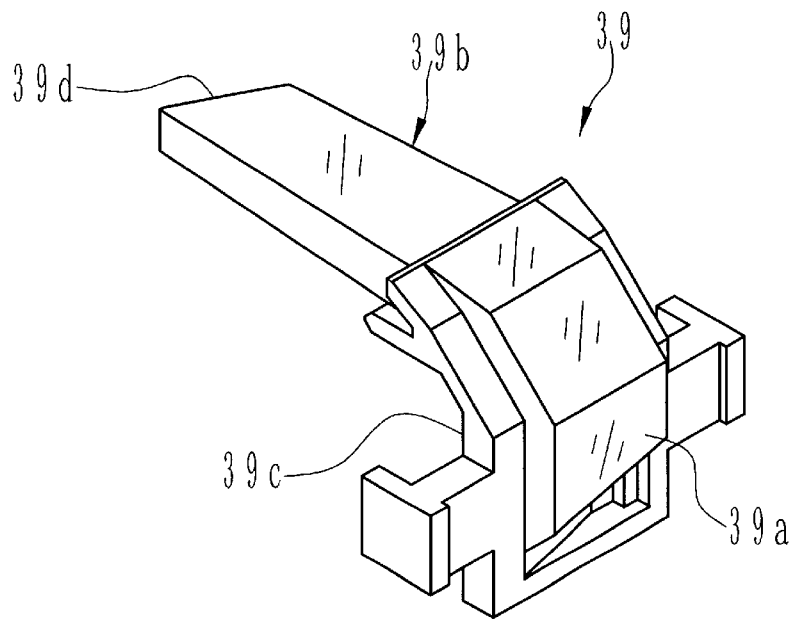
FIG. 3 is a perspective illustrating a light guide member for a date imprinting module.

In FIG. 3, the light guide member 39 is formed from transparent plastic material with fluorescent dye material. The light guide member 39 is constituted by an outer light entrance portion 39a, a flash light entrance portion 39b and a light exit portion 39c. The outer light entrance portion 39a receives entry of ambient light. The flash light entrance portion 39b receives entry of part of flash light leaked into the housing 12 from the flash emitter 38. The light exit portion 39c exits the received light in a direction toward the information imprinting module 34. The fluorescent dye material is mixed in the plastic for the purpose of increasing an effect of condensing the received light. To be precise, the light, upon entry into the light guide member 39, is radiated as flourescent rays because of the fluorescent dye material. Intensity of the radiated light is higher than that of light which would be radiated in a member similar to the light guide member 39 but without the fluorescent dye material. Consequently, the light is emitted by the light exit portion 39c at an amount with a relatively high ratio in consideration of the amount of the received light entered at the outer light entrance portion 39a and the flash light entrance portion 39b.

The flash unit 29 includes the flash emitter 38 and a flash circuit board 45. The flash circuit board 45 includes a main capacitor 41, a sync switch 42, a flash charger switch 43, booster windings, and various circuit parts. The flash emitter 38 includes a flash discharge tube and a reflector. The flash circuit board 45 has a printed circuit pattern to constitute a flash circuit with the plural circuit parts. The support plate 36 has one portion disposed in front of the flash circuit board 45. The flash charger button 21 in front of the support plate 36 is slid to turn on and off the flash charger switch 43. When the flash charger switch 43 is turned on, voltage applied by a battery 47 is boosted to charge the main capacitor 41.

When the shutter mechanism is actuated upon a shutter releasing operation, the sync switch 42 is turned on. In response to this, a trigger signal is sent to a flash discharge tube. The flash emitter 38 is discharged according to the voltage of the charge stored in the main capacitor 41, and emits flash light. The flash light is passed through the flash emitter window 19 and illuminates a photographic object.

Figure 4:
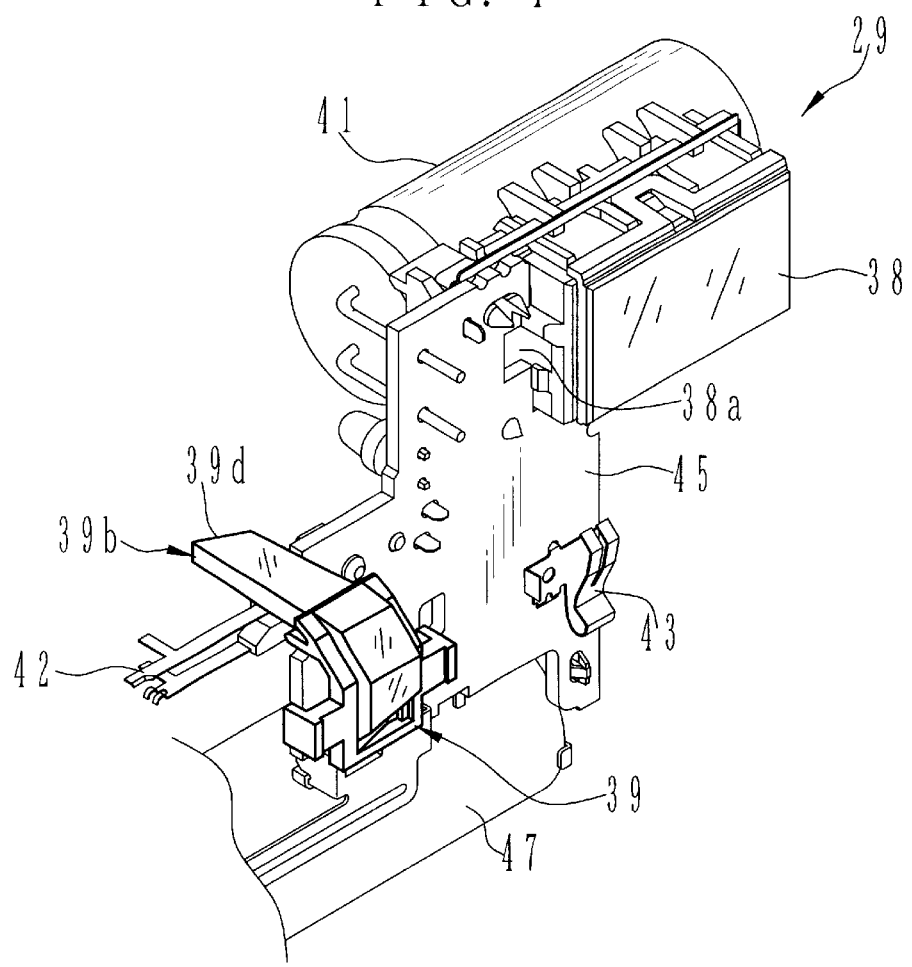
FIG. 4 is a perspective illustrating a flash unit with the light guide member.

In FIG. 4, the flash light entrance portion 39b is partially protruded to the rear of the flash circuit board 45 above the sync switch 42. A light entrance surface 39d is located in the rear end of the flash light entrance portion 39b, and has an inclination directed toward the flash emitter 38. A passage opening 38a is formed through the flash circuit board 45 and disposed beside the flash emitter 38. If the flash discharge tube is discharged, flash light is emitted. Part of the flash light leaks through the passage opening 38a toward the rear and front of the flash circuit board 45. Part of the flash light leaked to the rear is more than part of the flash light leaked to the front. At the time of flash emission, the leaked part of flash light is received by the flash light entrance portion 39b and guided into the light exit portion 39c.

As the light entrance surface 39d is disposed behind the flash circuit board 45 through which light is leaked at a great amount, the light entrance surface 39d can receive the light at a considerably great amount. As the light entrance surface 39d has the inclined face, the light entrance surface 39d can have an enlarged area of entry of the flash light. The light guide member 39 can obtain sufficiently much light as imprinting light, in particular if a photographic field is very dark. The inclined face of the light entrance surface 39d also enables the flash light to be guided in a regularized manner to the light exit portion 39c.

In the above embodiment, the flash light entrance portion 39b has the light entrance surface 39d with the inclination to enlarge an area of entry of flash light. However, the light entrance surface 39d of the flash light entrance portion 39b may have a plurality of combined inclined faces, for example, a shape patterned in corrugation, saw teeth or the like, to enlarge an area of entry of flash light.

In FIG. 3A, the outer light entrance portion 39a according to the embodiment has a front entrance surface 39g having an inclination and having surface roughness, as finished according to mat finish. Outer light entering the outer light entrance portion 39a is not reflected by the front entrance surface 39g in a mirror manner because of the surface roughness. The front entrance surface 39g diffuses the outer light in entry to the light guide member 39 in illumination of the front face of an display panel in the information imprinting module 34. An amount of outer light illuminating the display panel is obtained higher than that which would be obtained by a smooth and glossy front entrance surface.

Also, a rear exit surface 39h of the outer light entrance portion 39a may be finished according to mat finish and may have surface roughness, for the same purpose as the front entrance surface 39g.

In the above embodiment, the outer light entrance portion 39a has the front entrance surface 39g with the inclination to enlarge an area of entry of outer light. However, the front entrance surface 39g of the outer light entrance portion 39a may have a plurality of combined inclined faces, for example, a shape patterned in corrugation, saw teeth or the like, to enlarge an area of entry of outer light.

In the above construction, the light guide member 39 is a single piece including the outer light entrance portion 39a and the flash light entrance portion 39b in which light is entered individually and guided to the light exit portion 39c. However, it is possible that the outer light entrance portion 39a is a single piece individual from the flash light entrance portion 39b, and that light is guided by both of the outer light entrance portion 39a and the flash light entrance portion 39b to the light exit portion 39c.

In the above embodiment, the outer light entrance portion 39a is located under the flash light entrance portion 39b. However, the outer light entrance portion 39a may be disposed horizontally beside the flash light entrance portion 39b or above the flash light entrance portion 39b.

A slot 33a is formed in the rear cover 33 to uncover the battery 47 and the winder wheel 26. The rear cover 33 is secured to the rear of the main body 31 removably, to keep the photo film cassette 27 contained in a light-tight manner with the main body 31. Openings are formed in lower ends of the cassette holder chamber 31a and the roll holder chamber 31b. Lower lids 48 and 49 are formed with the rear cover 33, and close those openings after insertion of the photo film cassette 27. The lower lid 48 will be open before removal of the photo film cassette 27 after exposures.

The winder wheel 26 is disposed on the cassette holder chamber 31a in a rotatable manner. A spool 35a of the photo film cassette 27 is engaged with a winding shaft formed with a lower face of the winder wheel 26. The winder wheel 26 constitutes a winding mechanism for causing the spool 35a to wind the photo film 37 by one frame after exposure. In response to winding by one frame, the shutter mechanism is charged for standing by for another frame. When feeding of one frame is completed, the retention mechanism is actuated to lock rotation of the winder wheel 26.

Figure 5:
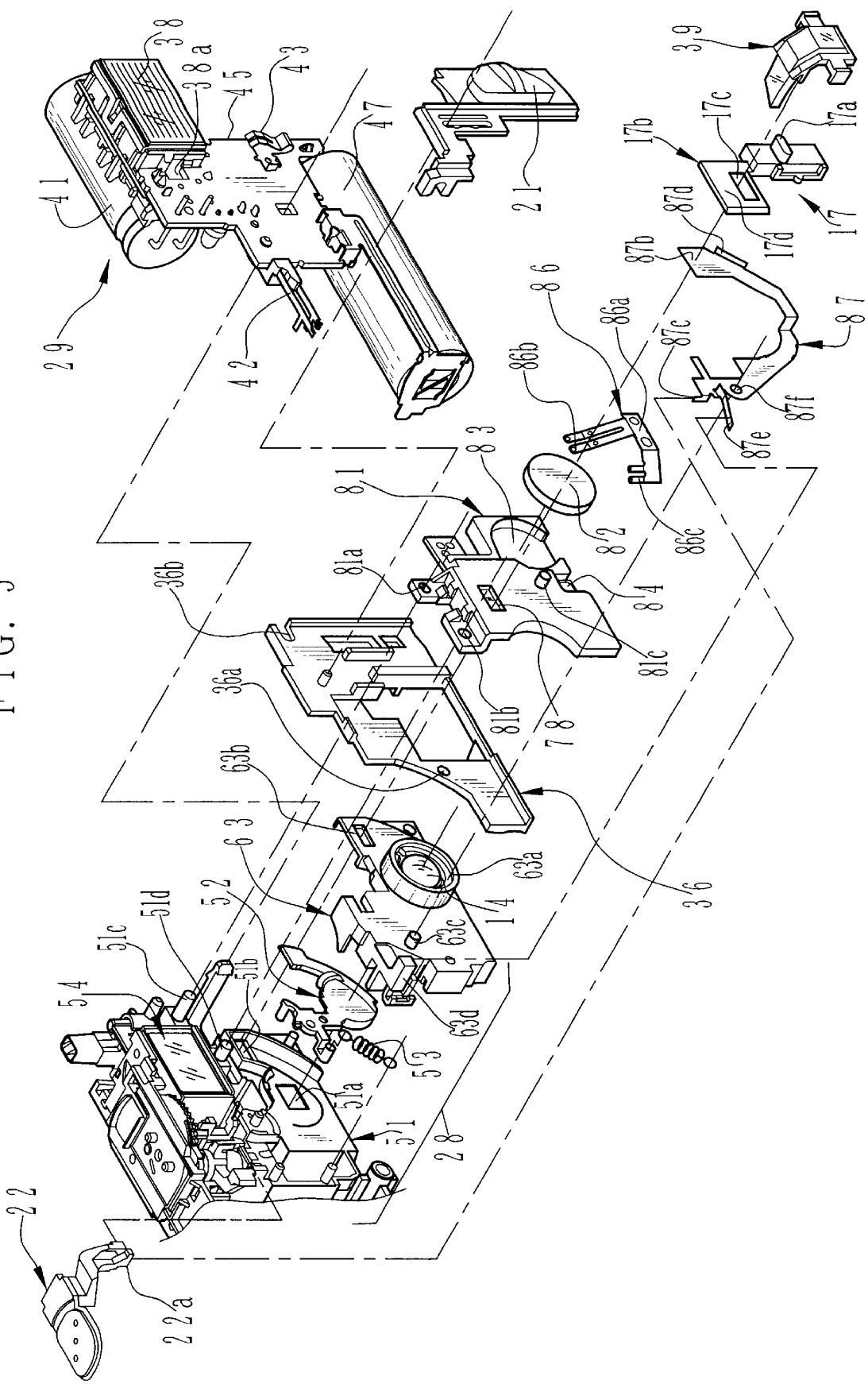
FIG. 5 is an exploded perspective illustrating an exposure unit, the flash unit and the information imprinting module in front of a main body.
Figure 6:
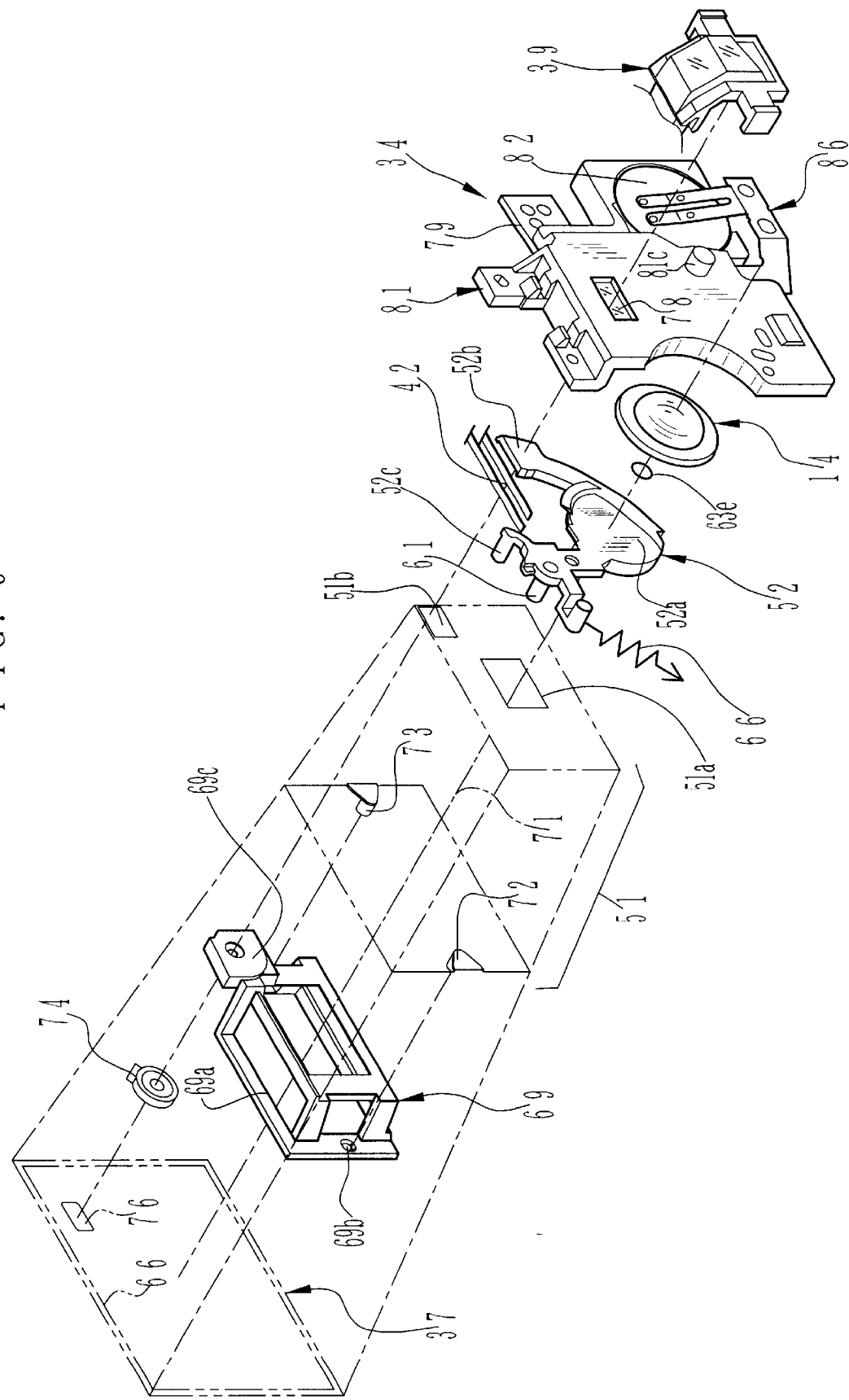
FIG. 6 is an exploded perspective illustrating a light-shielding tunnel, the exposure unit and the information imprinting module.

In FIGS. 5 and 6, the support plate 36 includes a light-shielding tunnel 51 having a prismatic shape protruding toward the front. The light-shielding tunnel 51 is provided with the taking lens 14, a shutter mechanism, a shutter charge mechanism, a photo film retention mechanism, a frame counter mechanism, and a viewfinder 54. The shutter mechanism includes a shutter blade 52 and a tension coil spring 53. The viewfinder 54 includes objective and eyepiece lenses.

A front wall of the light-shielding tunnel 51 is provided with a photographing opening 51a and an imprinting opening 51b. The photographing opening 51a causes entry of object light passed through the taking lens 14. The imprinting opening 51b causes entry of imprinting light for imprinting a date of an exposure. The shutter blade 52 is disposed in front of the light-shielding tunnel 51, and includes a photographing blade portion 52a and an imprinting blade portion 52b. The photographing blade portion 52a opens and shuts the photographing opening 51a. The imprinting blade portion 52b opens and shuts the imprinting opening 51b.

A pivot 61 protrudes from a front of the light-shielding tunnel 51, and defines a center about which the shutter blade 52 swings. The shutter blade 52 swings between shut and open positions about the pivot 61, and when in the shut position, shuts the photographing opening 51a and the imprinting opening 51b, and when in the open position, opens the photographing opening 51a and the imprinting opening 51b. The shutter blade 52 is biased by the tension coil spring 53 to the shut position to shut the photographing opening 51a and the imprinting opening 51b. In response to a shutter releasing operation, an upper end of the shutter blade 52 is knocked by a knocking lever in the shutter mechanism, and swung about the center at the pivot 61 to open and shut the photographing opening 51a and the imprinting opening 51b. Object light and imprinting light enter the light-shielding tunnel 51 and expose the photo film 37. When the shutter blade 52 swings to open the photographing opening 51a fully, a projection 52c at an upper end of the shutter blade 52 knocks and turns on the sync switch 42.

A shutter cover 63 is secured to the light-shielding tunnel 51 removably, and covers the shutter blade 52. A lens holder recess 63a is formed in the shutter cover 63 and supports the taking lens 14. An opening 63b is formed in the shutter cover 63 for passage of imprinting light directed to the imprinting opening 51b. A fixed stop opening 63e is disposed behind the taking lens 14.

An exposure region 66 is defined by the inside of the exposure aperture in the rear of the light-shielding tunnel 51. A light blocking member 69 is disposed inside the light-shielding tunnel 51, and blocks unwanted part of light included in the object light passed through the taking lens 14 but directed to the outside of the exposure region 66. The light blocking member 69 has an aperture frame 69a and holes 69b formed therein. The light blocking member 69 is moved along a photographing light path 71 into the light-shielding tunnel 51 in a direction toward the front. Pins 72 and 73 on the inside of the light-shielding tunnel 51 are inserted in the holes 69b. Then ends of the pins 72 and 73 are caulked to fix those to the holes 69b. A focusing lens 74 focuses imprinting light on to an imprinting region 76 in the exposure region 66. A lens holder portion 69c extends from the light blocking member 69, and supports the focusing lens 74.

Imprinting light introduced in the light-shielding tunnel 51 is focused by the focusing lens 74 on the imprinting region 76. The imprinting region 76 is disposed at the upper right corner of the exposure region 66. Thus, a date image is imprinted in a position under a principal image both in a horizontally oriented frame and in a vertically oriented frame. There is no overlapping of the date image on a human face included in the principal image.

The information imprinting module 34 is disposed in front of the exposure unit 28 with the support plate 36. The information imprinting module 34 includes a module circuit board, a module case 81 and a battery 82 of a button type. The module circuit board has a thin plate shape, and includes a timekeeper circuit 79 and a liquid crystal display panel 78 or LCD panel. The LCD panel 78 is a transmission type and indicates letters, signs or other information. The module case 81 contains the module circuit board. The battery 82 supplies the module circuit board with power.

The timekeeper circuit 79 has a memory, a reference pulse generator and an oscillator quartz. The memory stores information of a calendar of a number of years. The reference pulse generator is compensated for by the oscillator quartz to obtain the clock pulse. Thus, the timekeeper circuit 79 causes the LCD panel 78 to indicate information of a date including a day, month and year. Also, a preset switch is provided in the module circuit board for initializing the date, so as to determine a date of exposure with reference to the date of production in a factory. The preset switch is disposed in a position unaccessible from outside the housing 12 to avoid unwanted changes in the date upon a manual mishandling.

A battery holder recess 83 is formed in the module case 81 for supporting the battery 82. The battery 82 has a button type in a small size with a small thickness.

The LCD panel 78 is disposed behind the light guide member 39 and positioned at the light entrance opening 16 in the front cover 32, and indicates numerals, for example, '00 2 18 in such a manner that a background of the numerals is dark and the numerals are transparent. Each of the year, month and day is constituted by two digits. Each digit is constituted by seven segments. A head digit in the two digits for the month is constituted by two segments, because the head digit can only indicate 1 (one). The light exit portion 39c of the light guide member 39 is disposed in front of the LCD panel 78, and illuminates the LCD panel 78.

The battery 82 has front and rear surfaces. A negative electrode of the battery 82 is disposed at the front surface. A positive electrode of the battery 82 is disposed at the rear surface. The battery holder recess 83 has a substantially circular shape for receiving the battery 82 in a fitted manner. A positive contact segment (not shown) is disposed in the battery holder recess 83. A contact point 84 is disposed at a lower edge of the module case 81, is included in a patterned circuit, and is connected with the positive contact segment. When the battery 82 is inserted in the battery holder recess 83, the positive electrode is connected with the positive contact segment.

A negative contact segment 86 is secured to the inside of the front cover 32, and contacts a negative electrode of the battery 82 when the front cover 32 is fitted on the main body 31. The negative contact segment 86 is a plate of metal in a bent shape, and includes a base portion 86a and contact portions 86b and 86c. The base portion 86a is fixed on the front cover 32. The contact portions 86b and 86c extend from the base portion 86a toward respectively the battery 82 and the contact point 84. The contact portion 86b contacts the positive electrode of the battery 82. The contact portion 86c contacts the contact point 84. So the battery 82 supplies the timekeeper circuit 79 with power.

Positioning pins 51c and 51d as first positioning portions are formed with upper portions of the light-shielding tunnel 51. Positioning holes 81a and 81b as second positioning portions are formed in upper portions of the module case 81. When the positioning pins 51c and 51d are inserted in the positioning holes 81a and 81b, the timekeeper circuit 79 is precisely positioned. Also, the LCD panel 78 is set in its predetermined position. It is to be noted that the module case 81 may have the positioning pins and the light-shielding tunnel 51 may have the positioning holes.

Figure 7:
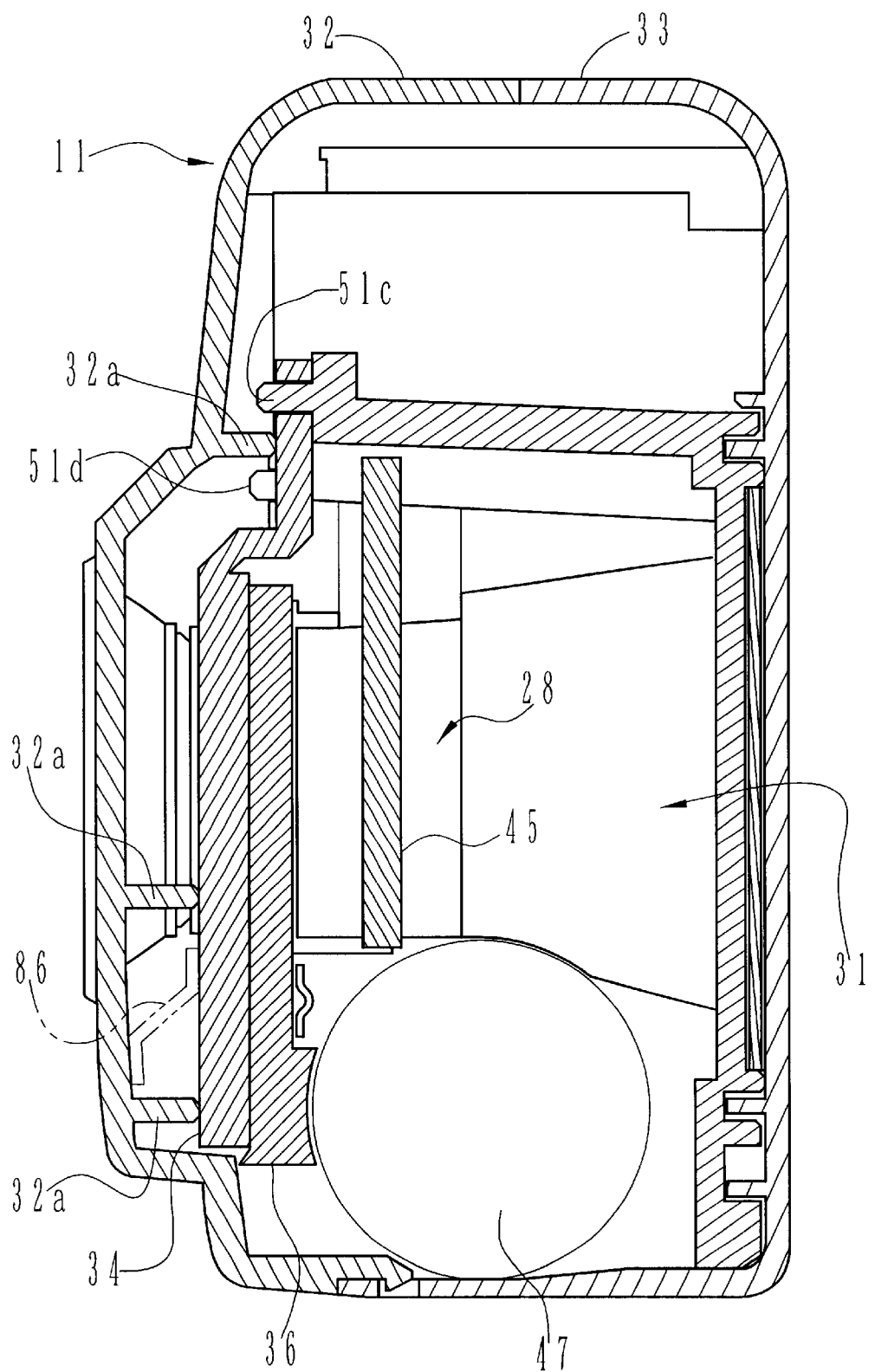
FIG. 7 is a cross section illustrating the lens-fitted photo film unit.

In FIG. 7, a state of the information imprinting module 34 disposed inside the lens-fitted photo film unit 11 is illustrated. The information imprinting module 34 is positioned by the positioning pins 51c and 51d, and kept squeezed between the support plate 36 and the front cover 32. Contact pins 32a are protruded from the inside of the front cover 32 toward the main body 31, and contact the information imprinting module 34. The contact pins 32a contact and keep the information imprinting module 34 positioned fixedly when the front cover 32 is fitted on the main body 31.

Furthermore, a blocking plate 87 is disposed in front of the information imprinting module 34 (See FIG. 5) together with the imprinting selector button 17 and the light guide member 39.

The imprinting selector button 17 is adapted to determine existence or lack of the information to be imprinted, and slidable between an ON and OFF positions, and when in the ON position, enables an imprinting operation, and when in the OFF position, disables the imprinting operation. The imprinting selector button 17 includes a button portion 17a and a plate portion 17b. The button portion 17a appears through the front cover 32. The plate portion 17b is insertable into an imprinting light path. When the button portion 17a is pushed to slide the imprinting selector button 17 up, the imprinting selector button 17 is in the ON position. When the button portion 17a is pushed to slide the imprinting selector button 17 down, the imprinting selector button 17 is in the OFF position.

The plate portion 17b includes an opening 17c and a blocking segment 17d. When the imprinting selector button 17 is in the ON position, the opening 17c becomes positioned in front of the LCD panel 78. Imprinting light from the light guide member 39 is passed through the opening 17c, illuminates the LCD panel 78 and imprints an auxiliary image or date image. When the imprinting selector button 17 is in the OFF position, the opening 17c is shifted away from a front of the LCD panel 78. The blocking segment 17d above the opening 17c is set in an imprinting light path and in front of the LCD panel 78. The blocking segment 17d, therefore, blocks the imprinting light between the light guide member 39 and the LCD panel 78.

Figure 8:
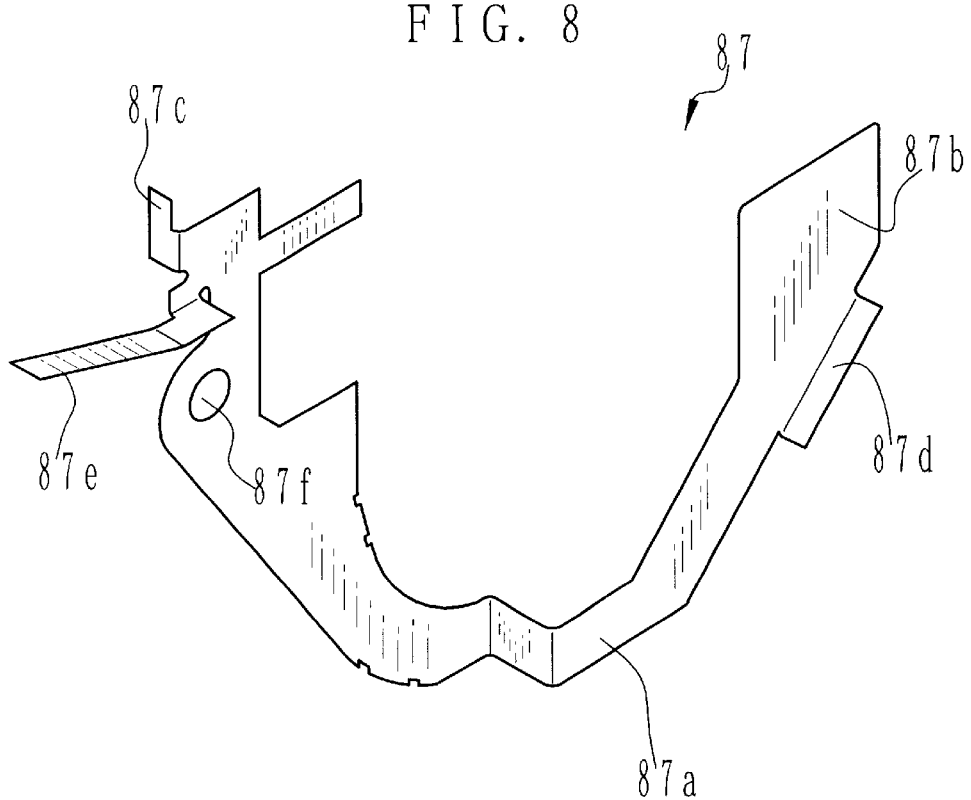
FIG. 8 is a perspective illustrating a blocking plate for use with the information imprinting module.

The blocking plate 87 operates for intercepting the imprinting light path to avoid errors in operation of the information imprinting module. In FIG. 8, the blocking plate 87 is a resilient plate of metal in a bent shape, and so disposed that the lens holder recess 63a lies between portions of the blocking plate 87. The blocking plate 87 is a single piece constituted by a driven arm or base portion 87a, a blocking arm 87b, a tongue 87c, a contact portion 87d and a resilient arm 87e. An axial hole 87f is formed in the driven arm 87a, and receives insertion of a support pivot 63c of the shutter cover 63 for securing of the blocking plate 87. The blocking arm 87b is pivotally movable between closed and open positions, and when in the closed position, is set in the imprinting light path, and when in the open position, is set away from the imprinting light path. The blocking arm 87b, when in the closed position, is in front of the LCD panel 78.

The tongue 87c protrudes upwards, and furthermore, bent toward the light-shielding tunnel 51. A first stopper 63d is formed with the shutter cover 63. A second stopper 81c is formed with the module case 81. The contact portion 87d and the resilient arm 87e cooperate with the first stopper 63d and the second stopper 81c to constitute the rotation regulator, and are adapted to limit a range of swinging the blocking plate 87.

Figure 9:
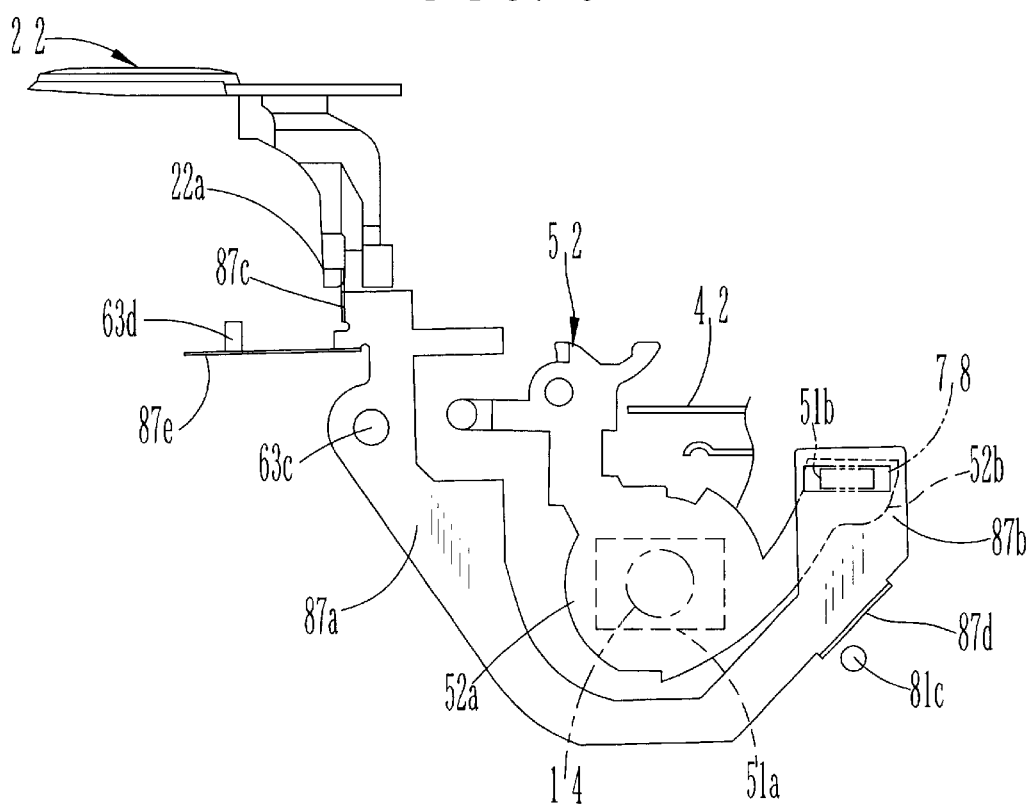
FIG. 9 is an explanatory view in front elevation, illustrating the blocking plate and a shutter mechanism in a state before operation.

In FIG. 9, a driving arm or retention lever 22a is formed on a lower face of the shutter release button 22, and contacts the tongue 87c. When the shutter release button 22 is depressed in FIG. 10, the driving arm 22a swings in the counterclockwise direction, to push the tongue 87c. The support pivot 63c constitutes a rotational center about which the blocking plate 87 swings clockwise. The blocking arm 87b moves toward the open position away from the imprinting light path.

When the blocking plate 87 swings in the clockwise direction, the contact portion 87d and the resilient arm 87e contact respectively the first stopper 63d and the second stopper 81c. Thus, the swinging range of the blocking plate 87 in the clockwise direction is limited. Then the shutter release button 22 is depressed. The blocking plate 87 swings to the open position with the resilient arm 87e and the driven arm 87a deformed resiliently. The blocking arm 87b moves away from the imprinting light path. Force to swing the blocking plate 87 back to the closed position occurs because of the resilient deformation of the resilient arm 87e and the driven arm 87a. A user's finger is moved away from the shutter release button 22. The tongue 87c is released from being pushed by the driving arm 22a. The blocking plate 87 is swung back to the closed position by resiliency of the resilient arm 87e and the driven arm 87a. Consequently, the resilient arm 87e and the driven arm 87a operate also as springs for moving the blocking plate 87 back to the closed position.

The recovery of the original shape of the blocking plate 87 causes the tongue 87c to push the driving arm 22a toward the left in the drawing. Thus, the blocking plate 87 also operates for helping the backward movement of the shutter release button 22 to the initial position.

Even when the lens-fitted photo film unit 11 is shocked or vibrated, the resilient arm 87e contacts the first stopper 63d to block a swing of the blocking plate 87 toward the open position. Even if the blocking plate 87 accidentally swings toward the open position with shock or vibration, the contact portion 87d contacts the second stopper 81c and instantaneously returns to its original position. There is no accidental imprinting to the photo film 37.

Figure 11:
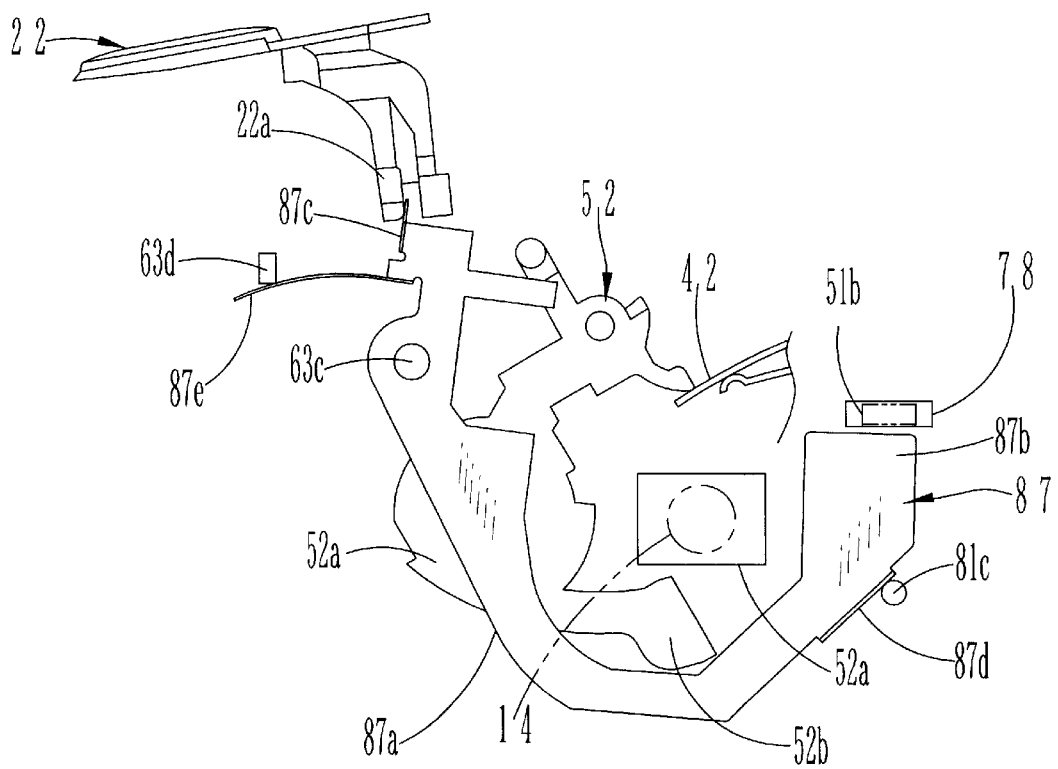
FIG. 11 is an explanatory view in front elevation, illustrating the same as FIGS. 9 and 10 but in a state of opening the shutter mechanism.

Upon an operation of releasing the shutter, the blocking plate 87 swings to open the imprinting light path, before the shutter blade 52 is knocked by a lever (not shown) and rotated in the clockwise direction. In FIG. 11, the imprinting blade portion 52b rotates away from the imprinting light path and opens the imprinting opening 51b. Imprinting light becomes incident upon the photo film 37 to imprint the date of taking the exposure. After movement of the blocking plate 87 from the imprinting light path, the shutter blade 52 rotates to open the imprinting light path. Thus, the blocking plate 87 does not block the imprinting light. The imprinting light can come incident upon the photo film 37 to imprint the photographing date.

The operation of a lens-fitted photo film unit constructed above is described now. In a process of assembly, the exposure unit 28 is built up by providing the main body 31 with the shutter mechanism, the photo film retention mechanism, the frame counter mechanism and the viewfinder optical system. Those elements are assembled in movement down toward the light-shielding tunnel 51.

While the front of the light-shielding tunnel 51 is kept oriented upwards, the shutter blade 52 and then the tension coil spring 53 are mounted on the light-shielding tunnel 51. Then the flash unit 29 is set by insertion of a rod, and secured to the main body 31 by engagement of claws. Now the sync switch 42 is disposed in a range of swinging the shutter blade 52. The shutter cover 63 with the taking lens 14 is secured to the front of the light-shielding tunnel 51.

After this, the support plate 36 with the flash charger button 21 is secured to the flash circuit board 45. A positioning hole 36a and a positioning cutout 36b are formed in the support plate 36, and are engaged with positioning pins (not shown) projecting from the main body 31.

The main body 31 is transferred to a module assembling station. The information imprinting module 34 is placed by inserting the positioning pins 51c and 51d into the positioning holes 81a and 81b. Also, the blocking plate 87, the imprinting selector button 17 and the light guide member 39 are simultaneously assembled. The information imprinting module 34 has not been fixed yet, but is only positioned by the positioning holes 81a and 81b.

The front cover 32 is fitted to the main body 31 next. Claws on the inside of the front cover 32 are engaged with the claws of the main body 31 to secure the front cover 32 thereto. In FIG. 7, the contact pins 32a come in contact with the information imprinting module 34, and press the same toward the main body 31. The information imprinting module 34 is squeezed between the front cover 32 and the main body 31 together with the support plate 36, and kept fixed.

Also, the negative contact segment 86 on the inside of the front cover 32 contacts a negative electrode of the battery 82. So powering of the information imprinting module 34 is started. After the front cover 32 is secured, terminals of a computer are connected with the information imprinting module 34 through the opening formed in the front cover 32, to initialize the information imprinting module 34.

Furthermore, the negative contact segment 86 may also have resiliency as a plate spring. The negative contact segment 86 can push the battery 82 so as to press the information imprinting module 34 against the main body 31. This is effective in reliably positioning the information imprinting module 34 on the main body 31.

The focusing lens 74 and the light blocking member 69 are assembled next. Those are moved into the main body 31 through the rear of the main body 31. To this end, the main body 31 is turned over, to direct the rear of the main body 31 upwards. The light blocking member 69 and the focusing lens 74 are inserted into the light-shielding tunnel 51 by downward movement.

The main body 31 with the focusing lens 74 and the light blocking member 69 positioned thereon is transferred into a darkroom, and then loaded with the photo film cassette 27. The cassette shell 35 and the photo film roll 37a are inserted in respectively the cassette holder chamber 31a and the roll holder chamber 31b, before the rear cover 33 is fitted on the main body 31 to close the lower lids 48 and 49. Loading of the photo film cassette 27 is completed. Finally, the outer packaging belt 13 is fitted on the housing 12 before external packaging, shipment and sales.

A user purchases the lens-fitted photo film unit 11 at a photo shop. FIG. 9 illustrates a state of no depression of the shutter release button 22, in particular, at the time of transporting the lens-fitted photo film unit 11. Even if the shutter blade 52 is accidentally swung by shock or vibration to the lens-fitted photo film unit 11, the blocking plate 87 can safely prevent the imprinting opening 51b from opening.

If the blocking plate 87 is moved away from the imprinting light path by shock or vibration, the blocking plate 87 comes in contact with the first stopper 63d and the second stopper 81c, and returns to its original position because of reaction in the contact. Even if the imprinting selector button 17 is set in the effective position for turning on, there occurs no erroneous imprinting of a date to the photo film 37.

If imprinting of a date is desired at the time of an exposure, the imprinting selector button 17 is set in the ON position. The winder wheel 26 is rotated to wind the photo film 37 by one frame. The shutter mechanism is charged.

Figure 10:
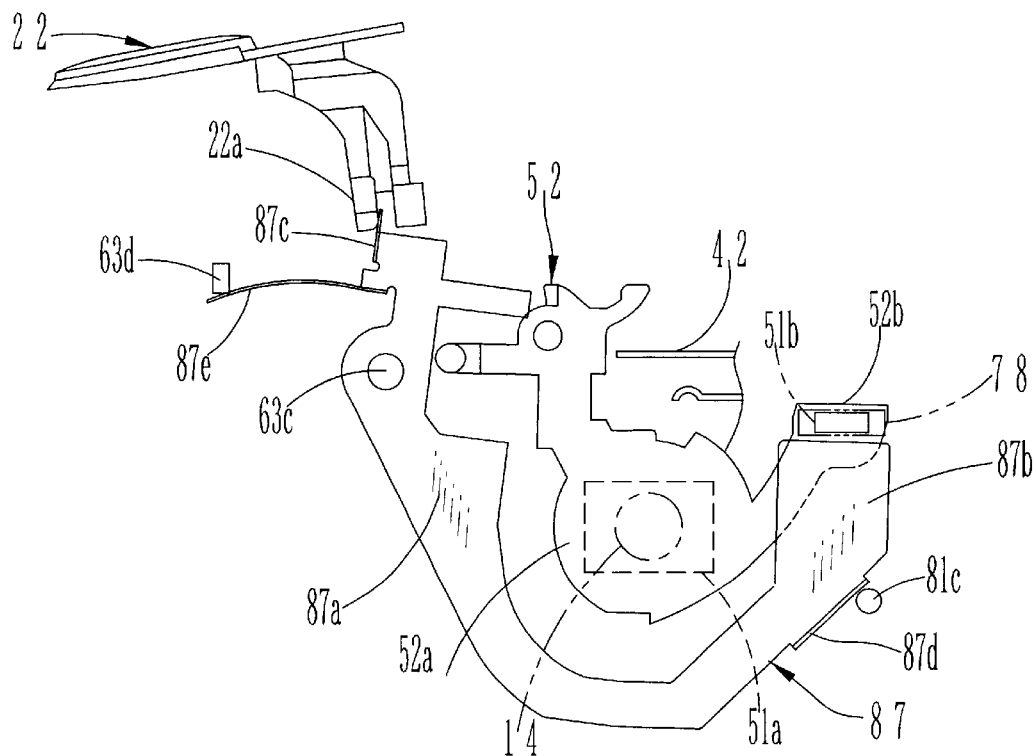
FIG. 10 is an explanatory view in front elevation, illustrating the same as FIG. 9 but in an initial step of depressing a shutter release button.

After a photographic field is framed, the shutter release button 22 is depressed. In FIG. 10, the depression of the shutter release button 22 rotates the blocking plate 87 in the clockwise direction. The blocking plate 87 is resiliently deformed by contact with the first stopper 63d and the second stopper 81c, to open the imprinting light path. Thus, outer light received through the outer light entrance portion 39a is passed through the light exit portion 39c and illuminates the LCD panel 78.

In FIG. 11, the shutter mechanism with the shutter blade 52 is actuated to open and shut the light paths.

Imprinting light through the LCD panel 78 enters the light-shielding tunnel 51 through the imprinting opening 51b. The imprinting light passes through the focusing lens 74, and is focused on the photo film in the imprinting region 76.

Object light passed through the taking lens 14 enters the light-shielding tunnel 51 through the photographing opening 51a, and is focused on the photo film in the exposure region 66. When the depression of the shutter release button 22 is discontinued, the tension coil spring 53 swings back the shutter blade 52 to shut the photographing opening 51a and the imprinting opening 51b. Thus, one exposure is taken. Note that the blocking plate 87 also returns to its closed position in an initial state because of its resiliency, to set the blocking arm 87b in the imprinting light path.

If a field to be photographed is sufficiently bright, ambient light of a great amount can be received by the outer light entrance portion 39a, so that the imprinting light can be enough for imprinting a date. If no imprinting of a date is intended, the imprinting selector button 17 is kept in a position of turning off. The blocking segment 17d intercepts the imprinting light path even when the blocking plate 87 and the imprinting blade portion 52b are away from the imprinting light path. No date is imprinted.

If a photographic field to be taken is dark, flash is used. To this end, the flash charger button 21 is slid up to start charging the flash unit. The user checks completion of charging by seeing a light guide member in the indicator window 24, and depresses the shutter release button 22. Consequently, the shutter blade 52 and the blocking plate 87 open and shut in the same manner as above, to introduce object light and imprinting light into the light-shielding tunnel 51. Also, the sync switch 42 is turned on instantaneously when the shutter blade 52 opens fully. A trigger signal is sent to the flash discharge tube, to emit flash light.

Flash light is applied by the flash emitter 38 to a photographic object. Object light, under illumination in combination of the flash light and outer light or ambient light, is passed through the taking lens 14 and focused on the photo film in the exposure region 66. Part of the object light enters the outer light entrance portion 39a and guided to the light exit portion 39c. In addition, the passage opening 38a of the flash emitter 38 introduces part of flash light to the front and rear of the flash circuit board 45. The partial flash light enters the flash light entrance portion 39b and guided to the light exit portion 39c. Thus, the combined light introduced by the outer light entrance portion 39a and the flash light entrance portion 39b is applied to and focused on the photo film in the imprinting region 76.

At the time of flash photography, part of flash light is received through the flash light entrance portion 39b together with outer light. As the flash light entrance portion 39b extends through the flash circuit board 45 and protrudes from the rear of the flash circuit board 45, flash light is received both from behind, and from in front of, the flash circuit board 45. Imprinting light can be obtained at a sufficient amount for the imprinting operation.

As the light guide member 39 protrudes to the rear of the flash circuit board 45, partial flash light of a great amount can be received behind the flash circuit board 45. If only outer light of an extremely small amount exists, the light guide member 39 can obtain imprinting light of a sufficient amount.

The above-described operation is repeated, to expose all frames in the photo film 37. The lens-fitted photo film unit 11, after exposing all the frames, is forwarded to a photo laboratory, where the photo film cassette 27 is removed. The photo film 37 is developed and returned to the user. Photographic prints are produced and supplied to the user with the photo film 37. The lens-fitted photo film unit 11 after the removal of the photo film cassette 27 is withdrawn by a manufacturer in a collective manner, and recycled according to a suitable method.

In the lens-fitted photo film unit 11 in a recycling process after withdrawal, the outer packaging belt 13 is peeled from the housing 12, which is disassembled. Plastic parts such as the front cover 32, the main body 31 and the rear cover 33 are heated and melted to be raw material, from which plastic parts of the same kinds are remolded. The flash unit 29 and the information imprinting module 34 are subjected to inspection of performance. If there is no problem, the flash unit 29 and the information imprinting module 34 are transferred to a station for manufacturing a lens-fitted photo film unit, and are reused.

In the above embodiment, the blocking plate 87 is a plate of metal. However, the blocking plate 87 may be formed from plastic material or other suitable material having sufficient resiliency. Also, the shutter release button 22 and the blocking plate 87 may be included in a single piece.

In the above embodiment, the auxiliary module is the information imprinting module 34 between the main body and the front cover. However, an auxiliary module may be other device, such as an automatic exposure control module, and a low brightness warning module. The automatic exposure control module is such as disclosed in U.S. Pat. No. 5,634,163 (corresponding to JP-A 09-005817) in which the aperture stop is changed over automatically. The low brightness warning module informs a user with a signal of a warning message if object brightness is measured and lower than sufficient lowest brightness according to the photosensitivity of the photo film.

Figure 12:
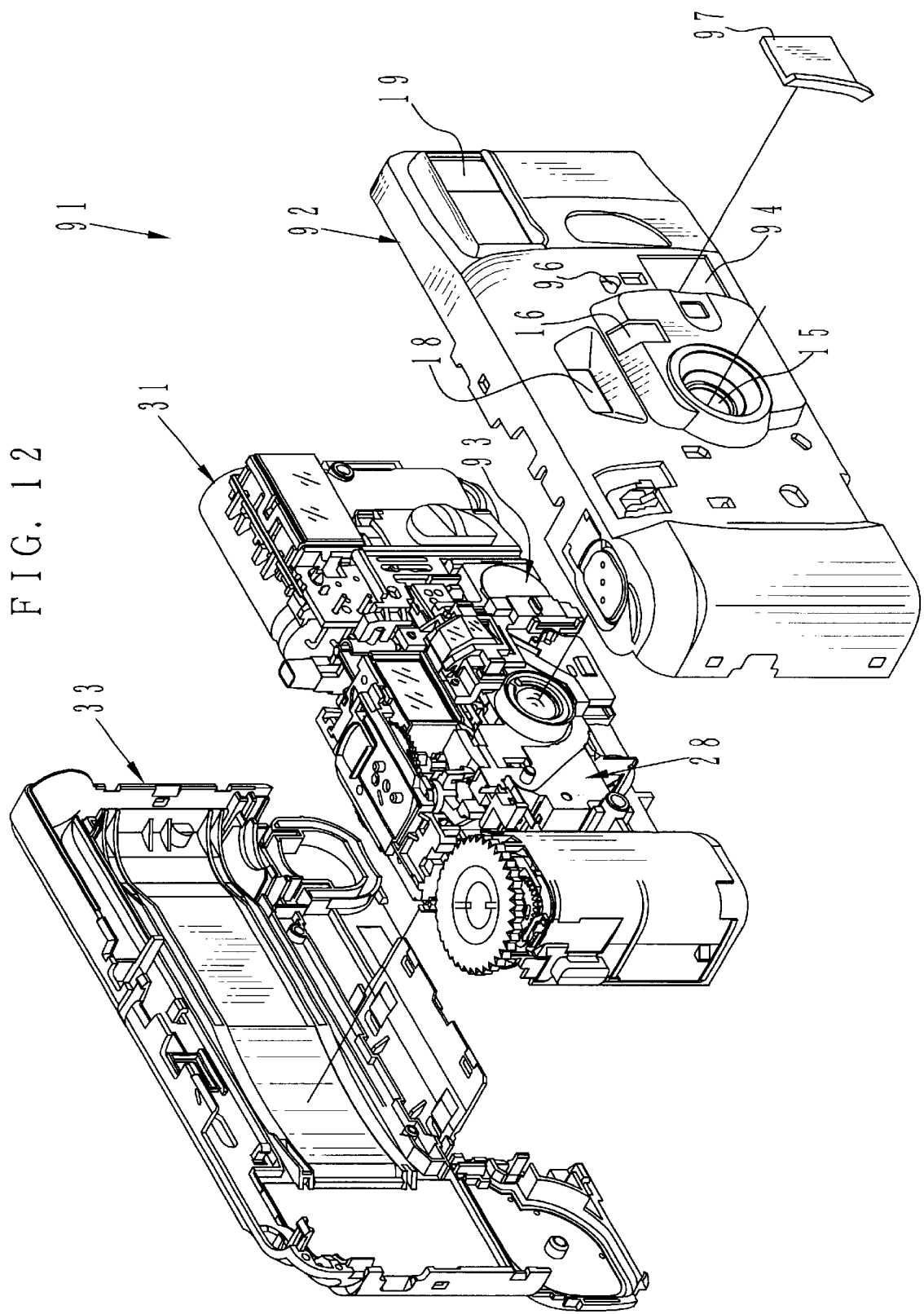
FIG. 12 is an exploded perspective illustrating another preferred lens-fitted photo film unit in which a battery for the information imprinting module can be readily removed.
Figure 13:
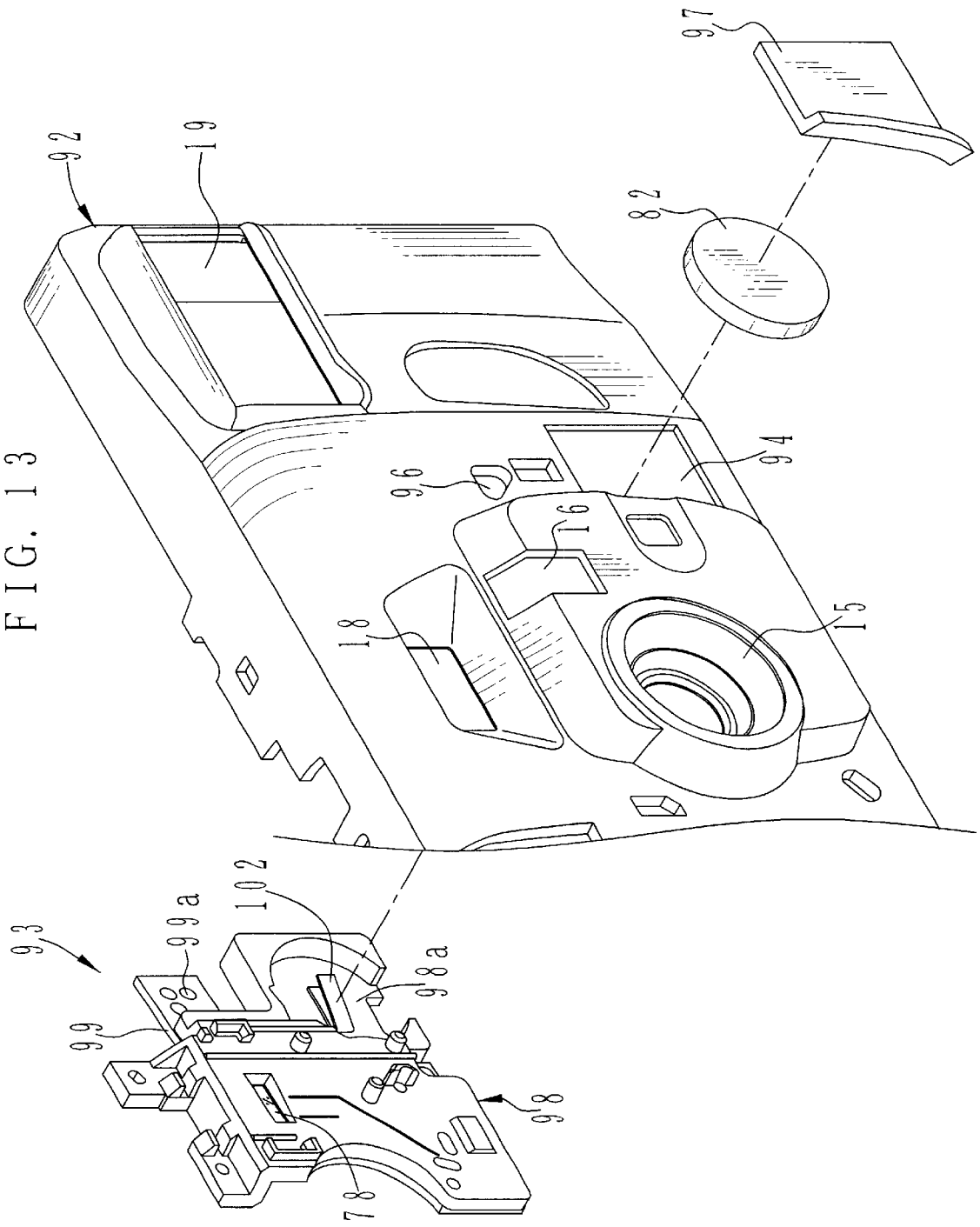
FIG. 13 is an exploded perspective illustrating the information imprinting module, a front cover and the battery.

In FIG. 12, another preferred lens-fitted photo film unit is illustrated, in which unauthorized reuse of an information imprinting module is prevented. Elements similar to those of the above embodiment are designated with identical reference numerals. In FIG. 13, a lens fitted photo film unit 91 includes a front cover 92, in which an opening 94 is formed in a quadrilateral shape, and is disposed directly in front of an information imprinting module 93 as auxiliary module. Also, an input hole 96 is formed in a portion higher than the opening 94. The opening 94 is adapted to fitting of the battery 82. A battery lid 97 is secured to close the opening 94 after placing the battery 82. The battery lid 97 has a size smaller than the opening 94. The input hole 96 is used for connection of terminals of a computer for initializing the information imprinting module 93. The battery lid 97 and the input hole 96 are covered by the outer packaging belt 13.

Figure 14:
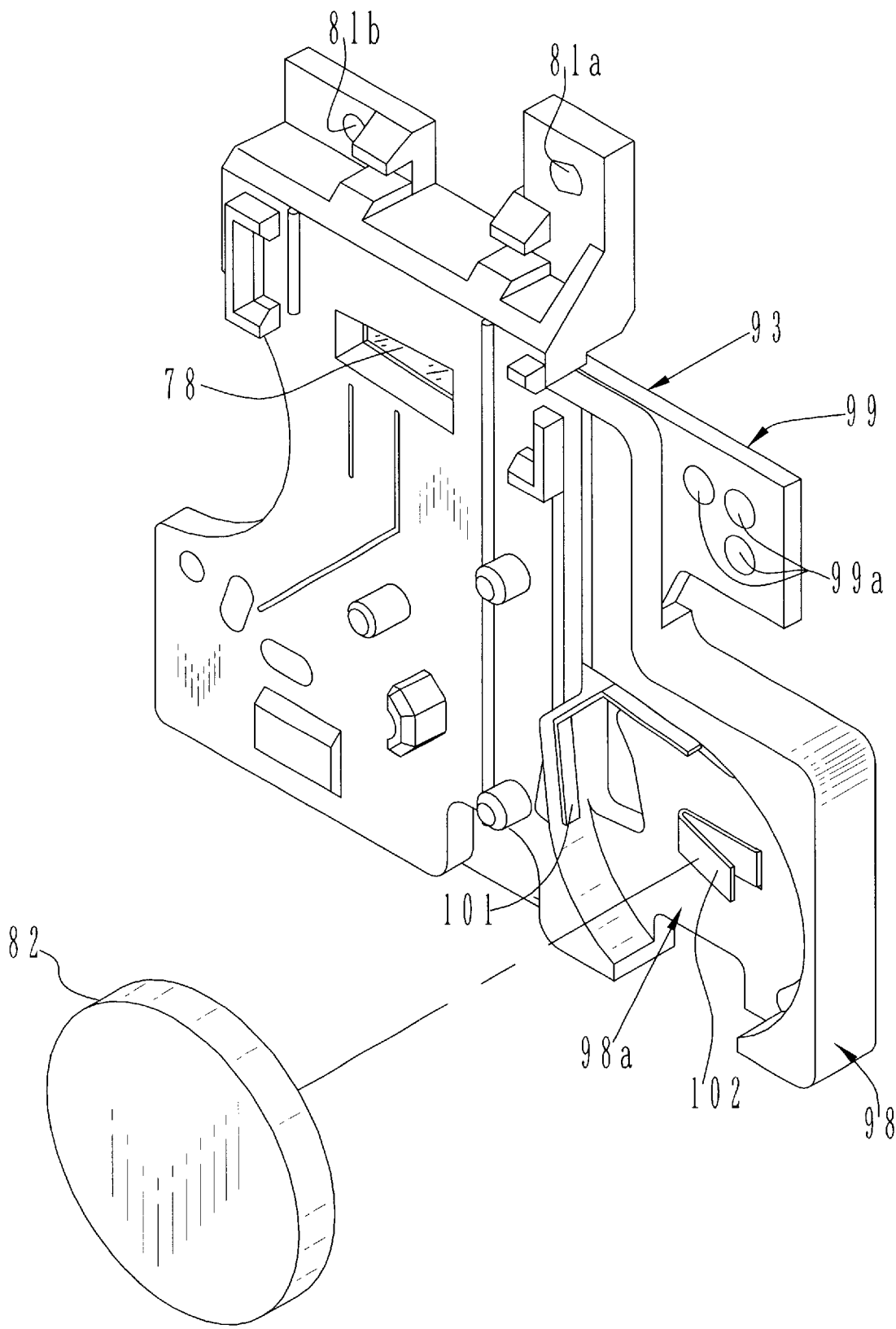
FIG. 14 is a perspective in enlargement, illustrating the information imprinting module and the battery.

In FIG. 14, the information imprinting module 93 is depicted. A battery holder recess 98a is formed in a module case 98. A module circuit board 99 is included in the information imprinting module 93. A negative metal contact segment 101 is disposed on a lateral surface of the battery holder recess 98a, and has one end connected to the module circuit board 99. The battery 82 is set in the battery holder recess 98a in an orientation for its negative electrode face to contact the negative contact segment 101. Also, a positive metal contact segment 102 is disposed at the center of the battery holder recess 98a. One end of the positive contact segment 102 is connected with the module circuit board 99. A second end of the positive contact segment 102 contacts a positive electrode face of the battery 82 in the battery holder recess 98a. Consequently, the battery 82 is connected with the module circuit board 99 electrically by the negative and positive contact segment 101 and 102. The positive contact segment 102 has a spring characteristic as produced by bending a single plate of metal. The resiliency of the positive contact segment 102 is enough to push the battery 82 out of the battery holder recess 98a upon peeling the outer packaging belt 13 or removing the front cover 92.

At the beginning of powering the module circuit board 99 in the information imprinting module 93, the information imprinting module 93 does not indicate the date having a day, month and year, because the LCD panel 78 is kept ineffective. If effectiveness of the LCD panel 78 is intended to indicate the date, input terminals 99a are used for inputting a preset code and an initial date information. The input terminals 99a are disposed directly behind the input hole 96. At the time of manufacturing the lens-fitted photo film unit 91, terminals of an external computer are connected with the input terminals 99a after the front cover 92 is fitted on the main body 31, to input the preset code and initial date information.

When the preset code is input to the module circuit board 99, the LCD panel 78 is enabled to indicate information. The preset code is managed by a manufacturer of the lens-fitted photo film unit 91 and kept confidential. This is effective in hindering third parties other than the manufacturer from reusing the information imprinting module 93, because operation of the LCD panel 78 cannot be enabled even when the powering of the module circuit board 99 is restarted.

A manufacturer, after withdrawing the lens-fitted photo film unit 91, disassembles the same. When the outer packaging belt 13 is peeled, the battery lid 97 is removed by means of adhesion of the outer packaging belt 13. The resiliency of the positive contact segment 102 pushes the battery 82 out of the opening 94 in the front cover 32, to remove the battery 82 from the information imprinting module 93. Powering to the module circuit board 99 is discontinued to disable circuits in the information imprinting module 93. The information imprinting module 93 is subjected to inspection of performance, and if no problem is found, is reused.

It is likely that the lens-fitted photo film unit 91 after use is withdrawn by a reloading dealer independent from the manufacturer. The reloading dealer is likely to reload the lens-fitted photo film unit 91 with an unused photo film cassette 27 or withdraw the information imprinting module 93. However, peeling of the outer packaging belt 13 disconnects the battery 82 from the information imprinting module 93 according to resiliency of the positive contact segment 102. The LCD panel 78 can be disabled. Also, removal of the front cover 92 from the main body 31 without peeling the outer packaging belt 13 can cause the same result. If a battery is set on the information imprinting module 93 upon reuse, the LCD panel 78 is disabled, and does not indicate a date.

The preset code is unknown to anybody except for those belonging to or related to the manufacturer. The LCD panel 78 is kept disabled. The lens-fitted photo film unit 91 cannot be used again. It is also impossible to reuse the information imprinting module 93 itself after separation. Thus, it is possible to increase a proportion of the number of products withdrawn by the original manufacturer to the number of all the products, as there is no withdrawal by some manufacturers, dealers or shops different from the original manufacturer. The information imprinting module 93 of a high cost can be reused reliably. The total of the manufacturing cost of the lens-fitted photo film unit 91 can be reduced.

In the above embodiment, the battery lid 97 is a member separate from the front cover 92. However, a hinge mechanism may be provided inside the front cover 92 for supporting the battery lid 97 on the front cover 92 in an openable manner. Furthermore, a sticker may be attached to the module battery without use of the battery lid 97. The module battery can be removed from the imprinting module by use of adhesion of the sticker.

In the above embodiment, resiliency of the positive contact segment 102 causes removal of the battery 82 from the information imprinting module 93 upon peeling of the outer packaging belt 13. However, a contact segment can be disconnected from the battery 82 upon peeling of an outer packaging belt.

Figure 15:
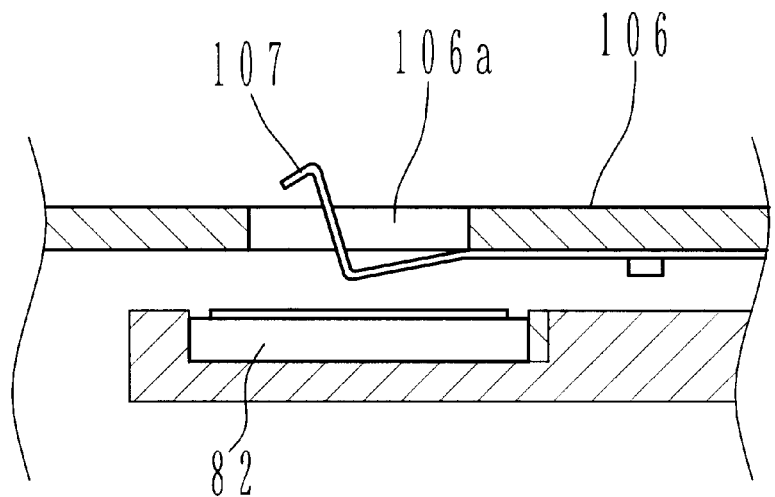
FIG. 15 is a section, partially broken, illustrating another preferred embodiment in which a contact segment is kept in contact with the battery, but away from the same when in a free state.
Figure 16:
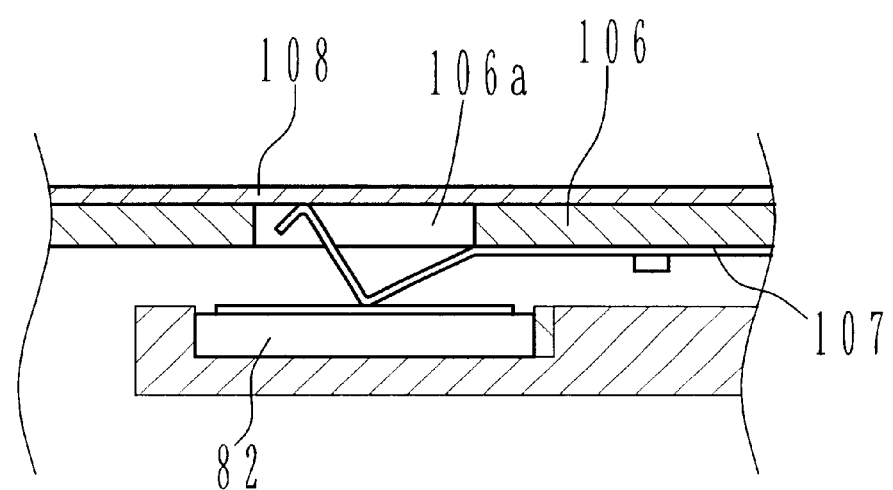
FIG. 16 is a section, partially broken, illustrating the same as FIG. 15 but in a contacted state.

This construction is depicted in FIGS. 15 and 16. A front cover 106 is provided with a negative contact segment 107. At the time of assembly, a first end (not shown) of the negative contact segment 107 is contacted with the module circuit board 99. An opening 106a is formed in the front cover 106. A second end of the negative contact segment 107 is positioned in the opening 106a in an externally accessible manner. An outer packaging belt 108 keeps a contact surface of the second end in contact with a negative electrode of the battery 82 according to assembly of the product. When the outer packaging belt 108 is peeled, resiliency of the negative contact segment 107 disconnects the battery 82 from the negative contact segment 107.

In the above embodiments, the opening 94, 106a is located in the front wall of the lens-fitted photo film unit. The battery holder recess 98a is directly inside the opening 94, 106a in the front wall. However, it is possible that the opening 94, 106a is located in the lower wall or lateral wall of the lens-fitted photo film unit. The battery holder recess 98a can lie inside the lower wall or lateral wall directly at the opening 94, 106a.

In the above embodiment, an outer packaging belt covers only the center of the housing. However, an outer packaging case may package the housing as outer packaging material. Furthermore, a sheet without an adhesive layer may be used as outer packaging material instead of the sticker. Also, structures of the present invention may be used in devices other than a lens-fitted photo film unit, for example a camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit comprising:
   a main body pre-loaded with photo film;
   an exposure unit, secured to said main body, for providing said photo film with an exposure;
   a front cover for covering a front of said main body and said exposure unit;
   a plate-shaped auxiliary module, secured between said main body and said front cover;
   at least one first positioning portion formed in said front of said main body;
   at least one second positioning portion, formed in a rear of said auxiliary module, and fitted on said first positioning portion, one of said first and second positioning portions including a pin, and remainder thereof including a hole; and
   a pushing surface, formed with said front cover, for pushing said auxiliary module to said main body;
   wherein no portion of the main body passes through a plane defined by a front surface of the plate-shaped auxiliary module.

2. A lens-fitted photo film unit as defined in claim 1, wherein said auxiliary module is an information imprinting module for optically imprinting information to said photo film.

3. A lens-fitted photo film unit as defined in claim 2, wherein said information is date information;
   said information imprinting module includes:
   a timekeeper circuit for storing calendar information, and for outputting said date information by periodically renewing said calendar information;
   a display panel of a transmission type for indicating said date information.

4. A lens-fitted photo film unit as defined in claim 3, wherein said information imprinting module is reset upon is continuation of being supplied with power.

5. A lens-fitted photo film unit as defined in claim 3, further comprising:
   a photographing opening, formed in said exposure unit, for introducing object light to said photo film;
   an imprinting opening formed in said exposure unit, disposed beside said imprinting opening, for introducing light through said display panel to said photo film.

6. A lens-fitted photo film unit as defined in claim 5, further comprising:
   a shutter release button; and
   a blocking plate, movable between closed and open positions, for closing said imprinting opening when in said closed position, for opening said imprinting opening when in said open position, and for being shifted to said open position in response to actuation of said shutter release button.

7. A lens-fitted photo film unit as defined in claim 3, further comprising a light guide member for illuminating said display panel by guiding light thereto.

8. A lens-fitted photo film unit as defined in claim 7, further comprising:
   a flash emitter for emitting flash light;
   a flash circuit board for controlling operation of said flash emitter;
   said light guide member includes:
   a flash light entrance portion, having at least one portion protruding to a rear of said flash circuit board, for receiving entry of part of said flash light;
   a light exit portion for applying light to a front face of said display panel by guiding said part of said flash light.

9. A lens-fitted photo film unit as defined in claim 8, wherein said light exit portion has front and rear faces at least one of which is inclined and has surface roughness; and said light guide member is formed from material including fluorescent dye.

10. A lens-fitted photo film unit as defined in claim 4, further comprising:
   first and second metal contact segments connected with said information imprinting module;
   a battery, connected between said first and second contact segments, for supplying said information imprinting module with power;
   wherein said front cover has said first contact segment secured thereto, and upon being removed, disconnects said battery from said first contact segment, for discontinuing supply of power for said information imprinting module.

11. A lens-fitted photo film unit as defined in claim 4, further comprising:
   first and second metal contact segments connected with said information imprinting module;
   a battery, connected between said first and second contact segments, for supplying said information imprinting module with power;
   a first opening formed in said front cover and disposed outside said battery; and
   an outer packaging material, secured to an outer face of at least said front cover, for covering at least part of said first opening to keep said battery in contact with said first and second contact segments, wherein said outer packaging material, upon being removed, disconnects said battery from at least one of said first and second contact segments, for discontinuing supply of power for said information imprinting module.

12. A lens-fitted photo film unit as defined in claim 11, further comprising a battery holder for containing said battery, said battery holder having an inner face provided with said first contact segment;
   wherein said first contact segment biases said battery outwards;
   said outer packaging material pushes said battery to said first contact segment, and upon being removed, allows bias of said first contact segment to push said battery out of said battery holder.

13. A lens-fitted photo film unit as defined in claim 12, wherein said battery is a button type.

14. A lens-fitted photo film unit as defined in claim 11, further comprising a battery lid fitted in at least part of said first opening;
   wherein said outer packaging material covers at least part of said battery lid.

15. A lens-fitted photo film unit as defined in claim 11, further comprising a battery holder for containing said battery, said battery including first and second electrodes for contact with respectively said first and second contact segments;
   wherein said first contact segment is away from said first electrode when in a free state, said second contact segment is disposed in said battery holder and contacts said second electrode when said battery is contained in said battery holder; and
   said outer packaging material presses said first contact segment resiliently for keeping said first contact segment in contact with said first electrode, and upon being removed, sets said first contact segment in said free state, to discontinue supply of power for said information imprinting module.

16. A lens-fitted photo film unit comprising:
   a housing pre-loaded with photo film;
   a shutter release button;
   a photographing opening formed in said housing;
   a shutter mechanism for opening/shutting said photographing opening in response to actuation of said shutter release button, to provide said photo film with an exposure, said shutter mechanism comprising a single shutter blade including both a photographing blade portion for opening/shutting said photographing opening and an imprinting blade portion for opening/shutting said imprinting opening;
   an imprinting opening, formed in said housing, for imprinting optical information to said photo film; and
   a blocking plate, separate from the shutter blade, said blocking plate being movable between closed and open positions, for closing said imprinting opening when in said closed position, for opening said imprinting opening when in said open position, and for being shifted to said open position in response to actuation of said shutter release button.

17. A lens-fitted photo film unit as defined in claim 16, wherein said shutter release button is shiftable between an initial position and a depressed position lower than said initial position;
   said shutter mechanism further comprises a shutter drive lever for opening/shutting said shutter blade when said shutter release button is shifted to said depressed position.

18. A lens-fitted photo film unit as defined in claim 17, wherein said blocking plate is set in said closed position when said shutter release button is in said initial position, and set in said open position in response to a shift of said shutter release button to said depressed position before operation of said shutter drive lever.

19. A lens-fitted photo film unit as defined in claim 18, wherein said imprinting opening is disposed opposite to said shutter release button with reference to said photographing opening, and said blocking plate extends to said photographing opening by passing a position offset from said photographing opening.

20. A lens-fitted photo film unit as defined in claim 19, further comprising a spring for biasing said blocking plate toward said closed position.

21. A lens-fitted photo film unit as defined in claim 20, wherein said spring is formed with said blocking plate;
   further comprising a stopper pin for receiving one end of said spring upon shifting of said blocking plate to said open position, said spring biasing said blocking plate for shifting said blocking plate back to said closed position.

22. A lens-fitted photo film unit comprising:
   a housing pre-loaded with photo film;
   an information imprinting module, incorporated in said housing, for imprinting information to said photo film, said information imprinting module being reset upon discontinuation of being supplied with power;
   first and second metal contact segments connected with said information imprinting module;
   a battery for supplying said information imprinting module with power;
   a first opening formed in said housing and disposed outside said battery; and
   an outer packaging material, secured to an outer face of said housing, for covering at least part of said first opening to keep said battery in contact with said first and second contact segments, said outer packaging material, upon being removed, disconnecting said battery from at least one of said first and second contact segments, for discontinuing supply of power for said information imprinting module.

23. A lens-fitted photo film unit as defined in claim 22, wherein said housing includes:

a main body for containing said photo film;

a rear cover and a front cover for covering respectively a rear and a front of said main body;

said first opening is formed in said front cover.

24. A lens-fitted photo film unit as defined in claim 23, further comprising a battery holder for containing said battery, said battery holder having an inner face provided with said first contact segment;

wherein said outer packaging material pushes said battery to said first contact segment, and upon being removed, allows bias of said first contact segment to push out said battery.

25. A lens-fitted photo film unit comprising:

a housing pre-loaded with photo film;

an information imprinting module, incorporated in said housing, for imprinting information to said photo film, said information imprinting module being reset upon discontinuation of being supplied with power;

first and second metal contact segments connected with said information imprinting module;

a battery, connected between said first and second contact segments, for supplying said information imprinting module with power;

a first opening formed in said housing and disposed outside said battery;

a battery lid fitted in at least part of said first opening; and an outer packaging material, secured to an outer face of said housing, for covering at least part of said battery lid to keep said battery in contact with said first and second contact segments, said outer packaging material, upon being removed, disconnecting said battery from at least one of said first and second contact segments, for discontinuing supply of power for said information imprinting module.

26. A lens-fitted photo film unit comprising:

a housing pre-loaded with photo film;

an information imprinting module, incorporated in said housing, for imprinting information to said photo film, said information imprinting module being reset upon discontinuation of being supplied with power;

first and second metal contact segments connected with said information imprinting module;

a battery, including first and second electrodes for contact with respectively said first and second contact segments, for supplying said information imprinting module with power;

a battery holder for containing said battery;

wherein said first contact segment is away from said first electrode when in a free state, said second contact segment is disposed in said battery holder and contacts said second electrode when said battery is contained in said battery holder; and an outer packaging material, secured to an outer face of said housing, for pressing said first contact segment resiliently to keep said first contact segment in contact with said first electrode, and for, upon being removed, setting said first contact segment in said free state, to discontinue supply of power for said information imprinting module.

\* \* \* \* \*